(12) United States Patent
Hagari et al.

(10) Patent No.: US 9,164,011 B2
(45) Date of Patent: Oct. 20, 2015

(54) ESTIMATION DEVICE FOR CYLINDER INTAKE AIR AMOUNT AND INTERNAL EGR RATE IN INTERNAL COMBUSTION ENGINE

(71) Applicants: Hideki Hagari, Chiyoda-ku (JP); Tomokazu Makino, Chiyoda-ku (JP)

(72) Inventors: Hideki Hagari, Chiyoda-ku (JP); Tomokazu Makino, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 535 days.

(21) Appl. No.: 13/732,864

(22) Filed: Jan. 2, 2013

(65) Prior Publication Data
US 2013/0245967 A1    Sep. 19, 2013

(30) Foreign Application Priority Data
Mar. 19, 2012  (JP) .................................. 2012-061821

(51) Int. Cl.
G01M 15/05 (2006.01)
G06F 17/10 (2006.01)
F02D 41/18 (2006.01)
F02D 41/00 (2006.01)

(52) U.S. Cl.
CPC ............ *G01M 15/05* (2013.01); *F02D 41/0072* (2013.01); *F02D 41/18* (2013.01); *G06F 17/10* (2013.01); *F02D 2200/0402* (2013.01); *F02D 2200/0406* (2013.01); *F02D 2200/0411* (2013.01); *Y02T 10/47* (2013.01)

(58) Field of Classification Search
CPC .............. F02D 2200/0402; F02D 2200/0406; F02D 2200/0411; F02D 41/0072; F02D 41/18; G01M 15/05; G06F 17/10; Y02T 10/47
USPC ................ 702/45, 47; 73/114.32, 114.33; 123/480, 568.14; 701/101
See application file for complete search history.

(56) References Cited

U.S. PATENT DOCUMENTS

| 5,590,632 A | 1/1997 | Kato et al. |
| 6,711,489 B2 * | 3/2004 | Haskara et al. ............... 701/101 |
| 2008/0127938 A1 | 6/2008 | Hagari |

FOREIGN PATENT DOCUMENTS

| JP | 07301144 A | 11/1995 |
| JP | 2007-255206 A | 10/2007 |

(Continued)

OTHER PUBLICATIONS

Communication dated Apr. 3, 2015 from the State Intellectual Property Office of the P.R.C. in counterpart application No. 201310062150.0.

(Continued)

*Primary Examiner* — John H Le
(74) *Attorney, Agent, or Firm* — Sughrue Mion, PLLC

(57) ABSTRACT

An estimation device for a cylinder intake air amount and an internal EGR rate in an internal combustion engine is provided which is capable of making an estimation with a high degree of accuracy in a small number of adaptation constants. The estimation device calculates a volumetric efficiency corresponding value and the internal EGR rate based on an exhaust efficiency (a linear function of intake pipe internal pressure) which is an index indicating an amount of residual gas which is an exhaust gas after combustion remaining in the cylinder without being discharged from the cylinder to an exhaust pipe, and an intake efficiency (a linear function of intake pipe internal pressure) which is an index indicating an amount of air coming into the cylinder from the intake pipe excluding the residual gas.

9 Claims, 17 Drawing Sheets

(56) References Cited

FOREIGN PATENT DOCUMENTS

| | | |
|---|---|---|
| JP | 2006-189013 A | 2/2009 |
| JP | 2008-138630 A | 9/2009 |
| JP | 2011-047367 A | 3/2011 |

OTHER PUBLICATIONS

Japanese Office Action dated Feb. 5, 2013, JPA No. 2012-061821.

* cited by examiner

Fig. 4 (a) AT THE TIME OF THE CLOSURE OF EXHAUST VALVE

Fig. 4 (b) AT THE TIME OF THE START OF SUCKING FRESH AIR

Fig. 4 (c) AT THE TIME OF THE END OF INTAKE STROKE

ESTIMATION DEVICE FOR CYLINDER INTAKE AIR AMOUNT AND INTERNAL EGR RATE IN INTERNAL COMBUSTION ENGINE

BACKGROUND OF THE INVENTION

1. Field of the Invention

The present invention relates to a control device for an internal combustion engine which is provided with a variable valve drive mechanism, and more specifically, to an estimation device for a cylinder intake air amount and an internal EGR rate in an internal combustion engine, which serves for calculating an amount of intake air in a cylinder and an internal EGR rate with a high degree of accuracy.

2. Description of the Related Art

In general, in order to control an engine in a suitable manner, it is important to calculate an amount of air to be sucked into a cylinder with a high degree of accuracy, and to carry out fuel control and ignition control according to the amount of air which has been sucked into the cylinder.

As for the fuel control, fuel need only be controlled so that an amount of fuel is injected to provide a target air fuel ratio with respect to the amount of intake air sucked into the cylinder, but as for the ignition control, there is a need to control ignition timing to an ignition advance angle (MBT: Minimum Spark Advance for Best Torque) so as to provide a maximum output power of the engine according to not only the engine rotational speed and the amount of intake air sucked into the cylinder, but also other factors (e.g., the temperature of the engine, the situation of the occurrence of a knock, the property of fuel, the amount of EGR).

Among the above-mentioned factors which have an influence on the MBT, for example, the temperature of the engine can be detected by an engine cooling water temperature sensor, and the situation of the occurrence of a knock can be detected by a knock sensor, and the property of fuel can be determined as regular gasoline or high-octane gasoline according to the situation of the occurrence of a knock.

However, as for the amount of EGR, there has been known, as a first conventional device, a technique in which an EGR valve is arranged in an EGR passage which connects an exhaust pipe and an intake pipe with each other, so that the amount of EGR (external EGR) is controlled by the valve opening degree of the EGR valve.

In addition, as a second conventional device, there has been known a technique in which a variable valve timing mechanism (hereinafter referred to also as "VVT") is provided which serves to make variable the valve opening and closing timing of an intake valve and an exhaust valve, so that the amount of EGR which is the exhaust gas remaining in the cylinder (internal EGR) is controlled by changing an overlap period in which the intake valve and the exhaust valve are in their open states at the same time according to the valve opening and closing timing. Moreover, the above-mentioned first and second techniques may be used at the same time.

As for the external EGR, a rough amount of EGR can be calculated from a degree of opening of the EGR valve, an atmospheric pressure, and an internal pressure in the intake pipe, but as for the internal EGR, a variety of kinds of techniques have been proposed, as will be described later. When the amount of external EGR and the amount of internal EGR can be estimated with a high degree of accuracy, it becomes able to control the engine at optimum fuel economy by correcting ignition timing in combination with other factors which have influences on the MBT.

In the past, as an estimation device for the amount of internal EGR, there has been proposed a technique in which a basic index of an internal EGR state is obtained from an overlap amount of intake and exhaust valves and an engine rotational speed, and a valve overlap center phase at which the amount of internal EGR becomes a minimum is obtained as a minimum EGR center phase, so that the basic index is corrected according to a deviation between an actual center phase of the valve overlap and the minimum EGR center phase, thereby estimating the internal EGR state (for example, refer to a first patent document).

In addition, as another estimation device, there has also been proposed a technique in which an overlap period of an intake valve and an exhaust valve is divided into a first half and a second half, and an approximate characteristic line for an amount of exhaust gas passing through the exhaust valve in each of the first and second half periods is calculated, and further, an amount of blow out gas and an amount of blow back gas are calculated by geometric calculation on the basis of each approximate characteristic line, thereby calculating an amount of residual gas (for example, refer to a second patent document).

Moreover, as another estimation device, there has also been proposed a technique in which a rate of residual gas is calculated based on an amount of residual gas at the time when an intake valve is open, and an amount of residual gas which is blown back in a valve overlap period (for example, refer to a third patent document).

In addition, in the technique described in the above-mentioned first patent document, it can also be said that a cause to increase an amount of arithmetic operation or calculation load is that there is a need to separately calculate an amount of intake air sucked into a cylinder, and hence, there has been the following problem. That is, many corrections are required in order to calculate the amount of internal EGR with a high degree of accuracy, and accordingly, the number of maps to be required becomes huge, and besides, it is also necessary to separately calculate the amount of intake air sucked into the cylinder.

Moreover, in the conventional technique described in the above-mentioned second patent document, the overlap period of the intake valve and the exhaust valve is divided into the first half and the second half, and the approximate characteristic line for the amount of exhaust gas passing through the exhaust valve in each of the first and second half periods is calculated, and the amount of internal EGR is calculated based on each approximate characteristic line. As a result, it is considered that the amount of internal EGR can be calculated in a relatively small number of maps, but similar to the first patent document, too, there has been the problem that it becomes necessary to separately calculate the amount of intake air sucked into a cylinder.

Further, in the conventional technique described in the above-mentioned third patent document, the amount of internal EGR is calculated based on the amount of residual gas at the time when the intake valve is open, and the amount of residual gas which is blown back in the valve overlap period. As a result, it is considered that it is possible to calculate the amount of internal EGR in a relatively small number of maps, but in this case, too, similar to the above-mentioned first patent document, there has been the problem that it becomes necessary to separately calculate the amount of intake air sucked into a cylinder.

However, when the amount of internal EGR, which remains in a cylinder without being discharged from an exhaust valve, and the amount of intake air to be sucked into the cylinder, which comes in from an intake valve, should be normally considered in an integral manner.

For example, it is considered that even with the same internal pressure in the intake pipe, in cases where the amount of internal EGR is large, the amount of intake air sucked into a cylinder becomes smaller, whereas in cases where the amount of internal EGR is small, the amount of intake air sucked into a cylinder becomes larger.

Here, note that in the past, as a calculation device for an amount of intake air in a cylinder, there has been proposed a technique in which in an AFS (air flow sensor) method, an intake system is modeled only from the law of conservation of mass so as to calculate an amount of intake air sucked into a cylinder (for example, refer to a fourth patent document).

In the fourth patent document (refer to paragraphs [0023], [0024], and [0038]-[0042]), the amount of intake air sucked into a cylinder is estimated with a sufficient degree of accuracy by controlling an engine in a suitable manner by means of a simple physical model using a volumetric efficiency corresponding value (a volumetric efficiency correction factor Kv) of air coming into the cylinder from an intake pipe.

It will be considered that if the relation between the volumetric efficiency correction factor Kv and the internal EGR rate shown in the fourth patent document becomes clear, the amount of intake air sucked into a cylinder and the internal EGR rate therein can be calculated with good accuracy at the same time.

However, in any of well-known literatures, there has not been disclosed such a technique which suggests the relation between the volumetric efficiency correction factor Kv and the internal EGR rate.

That is, in cases where a simple physical model such as the one described in the fourth patent document is used as an estimation device for an amount of intake air in a cylinder of an internal combustion engine, there has been a problem that the amount of intake air in the cylinder and the internal EGR rate therein can not be calculated with good accuracy at the same time, due to the fact that the relation between the volumetric efficiency correction factor Kv and the internal EGR rate is not clear.

PRIOR ART REFERENCES

Patent Documents

First Patent Document: Japanese patent application laid-open No. 2006-189013
Second Patent Document: Japanese patent application laid-open No. 2007-255206
Third Patent Document: Japanese patent application laid-open No. 2011-47367
Fourth Patent Document: Japanese patent application laid-open No. 2008-138630

SUMMARY OF THE INVENTION

With the conventional estimation devices for a cylinder intake air amount and an internal EGR rate in an internal combustion engine, in cases where the internal EGR rate is estimated in the internal combustion engine which is provided with a variable valve drive mechanism, the internal EGR rate changes according to the actual valve timing of the variable valve drive mechanism, so it is necessary to adapt the internal EGR rate according to valve timing. In addition, in cases where an amount of air actually sucked into a cylinder is estimated by a physical model of an intake system using a volumetric efficiency corresponding value which is an index indicating an amount of air coming into the cylinder from an intake manifold, too, the volumetric efficiency corresponding value changes according to the actual valve timing of the variable valve drive mechanism. As a result, in order to calculate the volumetric efficiency corresponding value with a high degree of accuracy, it is necessary to adapt the volumetric efficiency corresponding value according to the valve timing, and if it is constructed in such a manner, there has been a problem that the number of maps for storing these values become huge.

The present invention has been made in order to solve the problems as referred to above, and has for tis object to obtain an estimation device for a cylinder intake air amount and an internal EGR rate in an internal combustion engine, in which by focusing attention not on a technique to calculate only an amount of internal EGR as in the above-mentioned first through third patent documents, but on a relation between a volumetric efficiency correction factor and an amount of internal EGR used in a simplified physical model of an intake system as shown in the fourth patent document, it is possible to estimate the volumetric efficiency correction factor, the amount of intake air sucked into the cylinder, and the internal EGR rate, to a sufficient degree of accuracy for controlling the engine in a suitable manner, with a small number of adaptation constants and a small amount of calculation load, without requiring a huge memory capacity.

An estimation device for a cylinder intake air amount and an internal EGR rate in an internal combustion engine according to the present invention, which serves for estimating an amount of intake air sucked into a cylinder and an internal EGR rate in the internal combustion engine connected to an intake pipe at a location downstream of a throttle valve, is provided with: a volumetric efficiency corresponding value calculation unit that calculates a volumetric efficiency corresponding value which is an index indicating an amount of air coming into the cylinder from the intake pipe; a cylinder intake air amount estimation unit that estimates an amount of air actually sucked into the cylinder by using the volumetric efficiency corresponding value; and an internal EGR rate estimation unit that estimates the internal EGR rate based on an internal variable for calculating the volumetric efficiency corresponding value; wherein the volumetric efficiency corresponding value calculation unit calculates the volumetric efficiency corresponding value based on an exhaust efficiency which is an index indicating an amount of residual gas which is an exhaust gas after combustion remaining in the cylinder without being discharged from the cylinder to an exhaust pipe, and an intake efficiency which is an index indicating an amount of air coming into the cylinder from the intake pipe excluding the residual gas; and the internal EGR rate estimation unit calculates the internal EGR rate based on the exhaust efficiency.

According to the present invention, by calculating a volumetric efficiency corresponding value and an internal EGR rate based on an intake efficiency which represents an amount of fresh intake air and an exhaust efficiency which represents an amount of residual gas, it is possible to calculate the volumetric efficiency corresponding value and the internal EGR rate according to an operating state of an internal combustion engine with a high degree of accuracy.

BRIEF DESCRIPTION OF THE DRAWINGS

FIGS. 4(a) through 4(c) are views which diagrammatically show individual internal states of a cylinder at the time of the closure of an exhaust valve, at the time of the start of sucking fresh air, and at the time of the end of intake (suction) stroke, respectively, according to the first embodiment of the present invention.

The above and other objects, features and advantages of the present invention will become more readily apparent to those skilled in the art from the following detailed description of preferred embodiments of the present invention when taken in conjunction with the accompanying drawings.

BEST MODE FOR CARRYING OUT THE INVENTION

First Embodiment

Hereinafter, a first embodiment of the present invention will be explained in detail while referring to the accompanying drawings.

Figure 1:
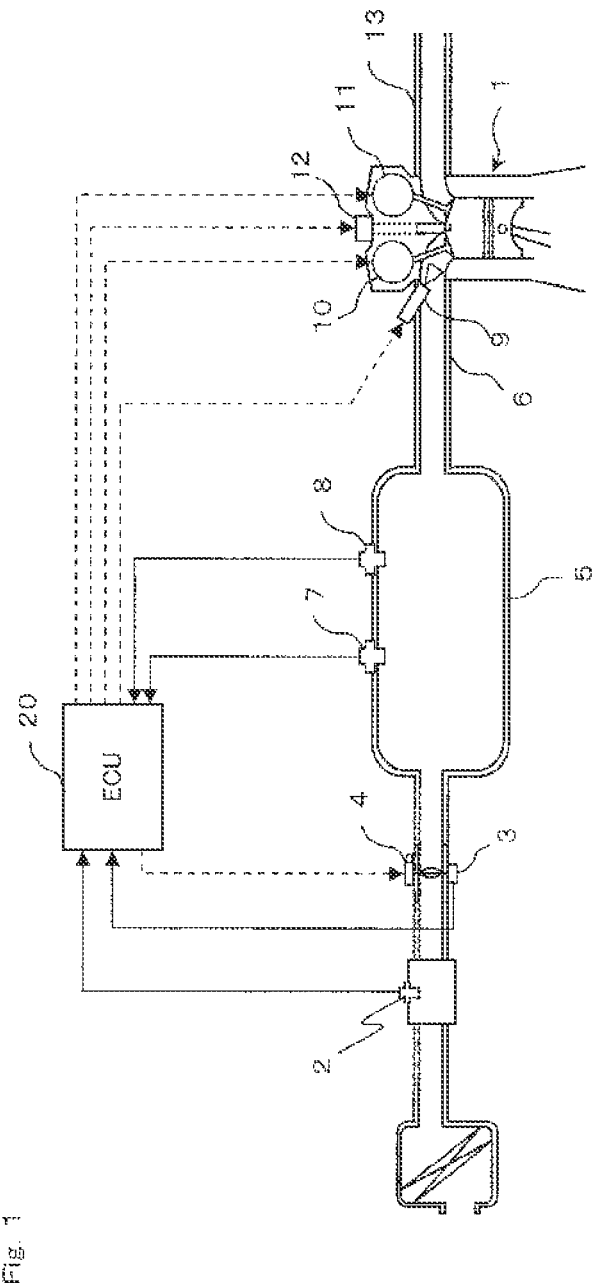
FIG. 1 is a block diagram schematically showing an estimation device for a cylinder intake air amount and an internal EGR rate in an internal combustion engine according to a first embodiment of the present invention.
Figure 2:
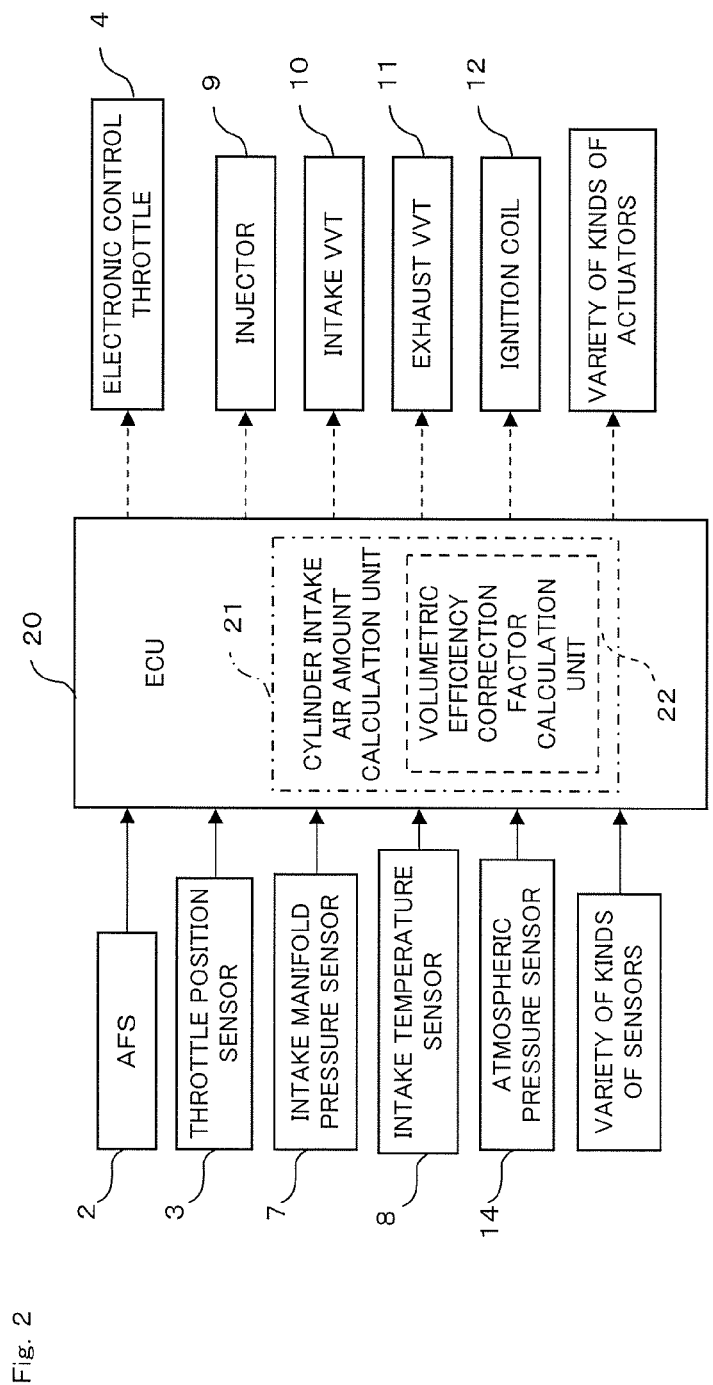
FIG. 2 is a block construction view schematically showing an engine and an engine control part according to the first embodiment of the present invention.

FIG. 1 is a block diagram schematically showing an estimation device for a cylinder intake air amount and an internal EGR rate in an internal combustion engine according to a first embodiment of the present invention, and FIG. 2 is a block construction view schematically showing an engine and an engine control part according to the first embodiment of the present invention.

In FIG. 1, the estimation device for a cylinder intake air amount and an internal EGR rate in an internal combustion engine is composed of a variety of kinds of sensors which are related to an engine 1, and an electronic control unit 20 which is connected to the variety of kinds of sensors. Hereinafter, the electronic control unit 20 is simply referred to as the ECU 20 (Electronic Control Unit).

The ECU 20 constitutes an engine control device, together with the variety of kinds of sensors and a variety of kinds of actuators, and controls the variety of kinds of actuators of the engine 1 based on various pieces of detection information from the variety of kinds of sensors, which indicate the operating states of the engine 1.

At the upstream side of an intake system of the engine 1, there is arranged an AFS 2 that serves to measure an amount of intake air to the engine 1, and at the downstream side of the AFS 2 (at the side of the engine 1), there is arranged an electronic control throttle 4 for regulating the amount of intake air.

A throttle actuator for controlling the degree of opening of the electronic control throttle 4 in an electronic manner and a throttle position sensor 3 for measuring the degree of opening of the electronic control throttle 4 are mounted on the electronic control throttle 4.

At the downstream side of the electronic control throttle 4, there are arranged a surge tank 5 and an intake manifold 6 which serve as an intake pipe (an intake manifold part) for introducing air into the engine 1.

The intake manifold 6, which constitutes a part of the intake pipe, is in communication with a combustion chamber in each of cylinders of the engine 1 through an intake valve.

On the other hand, at the downstream side of the engine 1, there is arranged an exhaust manifold 13 which serves as an exhaust pipe for discharging an exhaust gas which has resulted from the combustion of an air fuel mixture in each cylinder.

The exhaust manifold 13 is in communication with the combustion chamber in each cylinder of the engine 1 through an exhaust valve. In addition, though not illustrated, in the exhaust manifold 13, there are provided an O2 sensor for controlling the air fuel ratio of the mixture, and a catalyst for purifying the exhaust gas.

In the intake pipe at a location downstream of the electronic control throttle 4, there are arranged an intake manifold pressure sensor 7 that serves to measure the pressure (intake manifold pressure) in a space (the intake manifold) including the interiors of the surge tank 5 and the intake manifold 6, and an intake temperature sensor 8 that serves to measure the temperature (intake manifold temperature Tb) in the intake manifold.

Here, note that in place of the intake manifold pressure sensor 7 for measuromg the intake manifold pressure, there may be provided a unit for estimating the intake manifold pressure, and in place of the intake temperature sensor 8 for measuring the intake manifold temperature Tb, there may be provided a temperature sensor (e.g., a temperature sensor built in the AFS 2) that serves to measure an ambient air temperature (though strictly different from the intake manifold temperature Tb) in an approximate manner.

An injector 9 for injecting fuel is arranged in the intake manifold 6 in the vicinity of the intake valve, and an intake VVT 10 and an exhaust VVT 11, which serve to make the valve timing of the intake and exhaust valves variable, are attached to the intake valve and the exhaust valve, respectively.

In addition, an ignition coil 12 for driving a spark plug to generate a spark inside a cylinder is arranged in a cylinder head.

In FIG. 2, the ECU 20 is provided with a cylinder intake air amount calculation unit 21, and in addition, the cylinder intake air amount calculation unit 21 is provided with a volumetric efficiency correction factor calculation unit 22.

Here, note that the volumetric efficiency correction factor calculation unit 22 has not only a function as a calculation part for the volumetric efficiency correction factor Kv, but also a function as an internal EGR rate calculation part which serves to calculate an internal EGR rate Regr, as will be described later.

In addition to the individual above-mentioned sensors 2, 3, 7 and 8, an atmospheric pressure sensor 14 for measuring an ambient atmospheric pressure is connected to the ECU 20, so that the amount of intake air measured by the AFS 2, the degree of opening of the electronic control throttle 4 measured by the throttle position sensor 3, the intake manifold pressure measured by the intake manifold pressure sensor 7, the intake manifold temperature Tb measured by the intake temperature sensor 8, and the atmospheric pressure measured by the atmospheric pressure sensor 14 are inputted to the ECU 20.

Here, note that in place of the atmospheric pressure sensor 14 for measuring an atmospheric pressure, a unit for estimating an atmospheric pressure may be used, or an atmospheric pressure sensor built in the ECU 20 may be used.

In addition, a variety of kinds of measured values are also inputted to the ECU 20 from other various kinds of sensors (an accelerator opening sensor, a crank angle sensor, and so on) which are not illustrated here.

The cylinder intake air amount calculation unit 21 in the ECU 20 includes a physical model (to be describes later), and calculates an amount of intake air sucked into each cylinder (hereinafter simply referred to as a cylinder intake air amount) from the amount of intake air measured by the AFS 2. The ECU 20 drives the injector 9 and the ignition coil 12 based on the cylinder intake air amount thus calculated.

In addition, the ECU 20 calculates a target torque based on a variety of kinds of input information such as the degree of opening of the accelerator pedal, etc., and also calculates a target cylinder intake air amount for achieving the target torque thus calculated. The ECU 20 further calculates, as control target values for achieving the target cylinder intake air amount, a target throttle opening, a target intake VVT phase angle, and a target exhaust VVT phase angle, and controls the degree of opening of the electronic control throttle 4 and the phase angles of the intake VVT 10 and the exhaust VVT 11, so that these control target values can be achieved. Moreover, the ECU 20 controls a variety of kinds of other actuators, as required, which are not illustrated here.

Next, reference will be made in detail to the function of the cylinder intake air amount calculation unit 21, i.e., the physical model of the intake system for calculating the cylinder intake air amount from the amount of intake air measured by the AFS 2.

First, as a function of the number of strokes n of the engine 1, each of parameters $Qa(n)$, $Qc(n)$, $T(n)$ [s], $Vs$ [cm$^3$], $Vc$ [cm$^3$], $\rho b(n)$ [g/cm$^3$], and $Kv(n)$ is defined as follows.

$Qa(n)$ is an average value of the actual amount of intake air [g/s] measured by the AFS 2 for one stroke of the engine 1, and $Qc(n)$ is an average value of the cylinder intake air amount [g/s] for one stroke of the engine 1. $T(n)$ [s] is a period of time for one stroke of the engine 1 (i.e., 180 deg. CA in a 4-cylinder engine, and 240 deg. CA in a 3-cylinder engine).

In addition, $Vs$ [cm$^3$] is a volume of an intake pipe from a downstream side of the electronic control throttle 4 to an inlet port of each cylinder; $Vc$ [cm$^3$] is a volume of a cylinder stroke per cylinder; $\rho b(n)$ [g/cm$^3$] is an average value of a density of fresh air in the intake manifold for one stroke of the engine 1.

Moreover, $Kv(n)$ is a volumetric efficiency correction factor for air which comes into a cylinder from the intake manifold.

When the law of conservation of mass is applied by focusing only on fresh air (i.e., the air which comes into the intake manifold by way of the electronic control throttle 4) in a region represented by the intake pipe volume Vs from the downstream side of the electronic control throttle 4 to the inlet port of each cylinder of the engine 1, the following expression (1) will be satisfied.

[Expression 1]

$$Qa(n)T(n) - Qc(n)T(n) = \{\rho_b(n) - \rho_b(n-1)\} \cdot Vs \quad (1)$$

Then, the cylinder intake air amount $Qc(n)T(n)$ for one stroke is represented by the following expression (2), when using a volumetric efficiency correction factor $Kv(n)$.

[Expression 2]

$$Qc(n)T(n) = Kv(n) \cdot \rho_b(n) \cdot Vc \quad (2)$$

Here, note that at the time of a steady state operation, a product $Qa(n)T(n)$ of the average value $Qa(n)$ of the actual amount of intake air [g/s] for one stroke and the period of time $T(n)$ for one stroke is equal to a product $Qc(n)T(n)$ of the average value $Qc(n)$ of the cylinder intake air amount [g/s] for one stroke and the period of time $T(n)$ for one stroke becomes equal to each other, and hence, it is possible to calculate the volumetric efficiency correction factor Kv by the use of an expression in which the left hand side of the expression (2) is replaced with $Qa(n)T(n)$, at the time of adaptation of engine control constants.

Subsequently, by assigning the expression (2) to the expression (1), the average value $\rho b(n)$ of the fresh air density in the intake manifold for one stroke is eliminated, and solving the expression (1) for $Qc(n)T(n)$, $Qc(n)T(n)$ is represented by the following expression (3).

[Expression 3]

$$Qc(n)T(n) = \frac{Kv(n)}{Kv(n-1)} \cdot K \cdot Qc(n-1)T(n-1) + (1-K) \cdot Qa(n)T(n) \quad (3)$$

$$\because K = \frac{Vs}{Vs + Kv(n) \cdot Vc}$$

Here, in expression (3) above, K is a filter constant.

According to the expression (3), it is possible to calculate the cylinder intake air amount $Qc(n)T(n)$ from the amount of intake air $Qa(n)T(n)$ measured by the AFS 2, with a high degree of accuracy.

By further transforming the expression (3), the following expressions (4) will be obtained.

[Expression 4]

$$\frac{Qc(n)T(n)}{Kv(n)} = K \cdot \frac{Qc(n-1)T(n-1)}{Kv(n-1)} + (1-K) \cdot \frac{Qa(n)T(n)}{Kv(n)} \quad (4)$$

The expression (3) means a digital low pass filter in interrupt processing which is in synchronization with the rotation of the engine 1 (e.g., every prescribed crank angle). From this, it is found that the intake system of the engine 1 is a first order lag element.

Next, reference will be made in detail to processing for achieving the expression (3) within the ECU 20, i.e., an operation to carry out the cylinder intake air amount calculation unit 21 within interrupt processing at every prescribed crank angle, while referring to a flow chart shown in FIG. 3.

Here, the interrupt processing at every prescribed crank angle is assumed to be interrupt processing which is executed at every BTDC 5 deg. CA (hereinafter simply referred to as "B05 processing"), for example.

Figure 3:
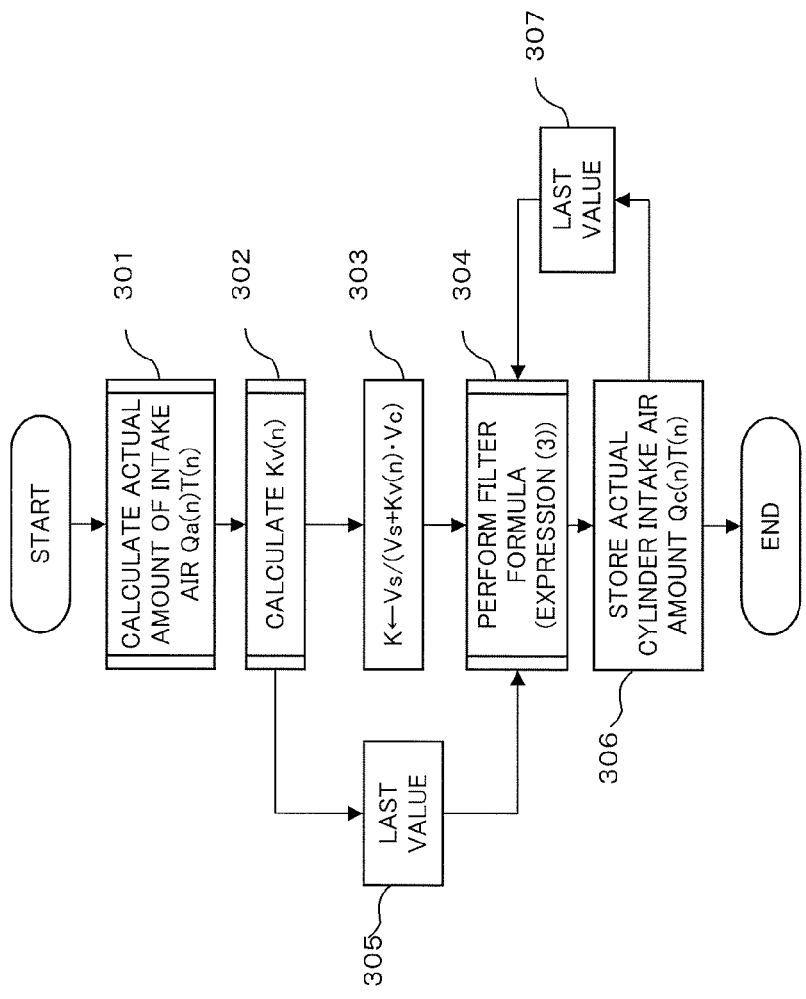
FIG. 3 is a flow chart showing calculation processing of an amount of intake air in a cylinder according to the first embodiment of the present invention.

FIG. 3 is a flow chart showing calculation processing of the cylinder intake air amount according to the first embodiment of the present invention.

In FIG. 3, the cylinder intake air amount calculation unit 21 in the ECU 20 first calculates the actual amount of intake air Qa(n)T(n) [g] for one stroke (step 301).

Specifically, in cases where the AFS 2 is a mass flow meter, the output voltage of the AFS 2 is integrated, while sampling every 1.25 ms, for example, so that the actual amount of intake air Qa(n)T(n) [g] for one stroke can be calculated based on the value integrated from the last interrupt processing until the current interrupt processing.

Here, note that in cases where the AFS 2 is a volume meter, the actual amount of intake air Qa(n)T(n) [g] for one stroke can be calculated by converting the volume of intake air into a corresponding mass based on a standard atmosphere density, an atmospheric pressure, and an intake air temperature.

Then, the volumetric efficiency correction factor calculation unit 22 in the cylinder intake air amount calculation unit 21 calculates the volumetric efficiency correction factor Kv(n) (step 302). Here, note that the details of calculation processing of the volumetric efficiency correction factor Kv(n) will be described later.

Subsequently, the cylinder intake air amount calculation unit 21 calculates a filter constant K according to a formula for calculation of the filter constant K within the expression (3) (step 303).

Thereafter, the cylinder intake air amount calculation unit 21 calculates an actual cylinder intake air amount Qc(n)T(n) [g] according to a filter formula within the expression (3) (step 304).

Here, note that as for a volumetric efficiency correction factor Kv(n−1) (last time) one stroke before the current stroke in the expression (3), the last volumetric efficiency correction factor Kv(n−1) one stroke before in step 302 is stored (step 305), so that the processing of step 304 is made possible by using this last value.

Finally, the cylinder intake air amount calculation unit 21 stores the actual cylinder intake air amount Qc(n)T(n) [g] calculated in step 304 (step 306), and then ends the processing routine of FIG. 3.

Here, note that an actual cylinder intake air amount Qc(n−1)T(n−1) [g] one stroke before (last time) in step 306 is stored (step 307), so that the processing of step 304 is made possible by using this last value as a parameter within the expression (3).

In this manner, the actual cylinder intake air amount Qc(n)T(n) [g] can be calculated with a high degree of accuracy by means of a simple calculation operation using the volumetric efficiency correction factor Kv(n).

Next, reference will first be made to approximation processing of the volumetric efficiency correction factor Kv(n) as the processing of the volumetric efficiency correction factor calculation unit 22 in the cylinder intake air amount calculation unit 21.

As mentioned above, the volumetric efficiency correction factor Kv(n) is a value corresponding to the volumetric efficiency correction factor for the air coming into a cylinder from the intake manifold. In the case of a general engine of fixed valve timing, in a partial load region (hereinafter also referred to as a partial region), the volumetric efficiency correction factor Kv(n) becomes a value of about 60-80%, and in a WOT (Wide Open Throttle, full load) region, it becomes a value of about 80-90%, but in the case of the engine 1 of variable valve timing which is provided with the intake VVT 10 and the exhaust VVT 11, the volumetric efficiency correction factor Kv(n) changes in a still larger range according to the valve opening and closing timing of the intake and exhaust VVTs 10, 11.

Thus, the following factors (A)-(E) can be considered as causes which make the volumetric efficiency correction factor Kv vary according to the operating state of the engine 1.

(A) The Valve Opening Times of the Intake and Exhaust Valves being Short

The operating periods of the intake and exhaust valves are limited (about 180 [deg. CA]), so the valves will be closed in the course of air flow before the exhaust stroke ends leaving a clearance (stroke) volume (or compression space), or before fresh air of a cylinder volume or piston displacement is sucked in (air before combustion to be drawn in through the intake pipe), (B) The Clearances of the Intake and Exhaust Valves Being Narrow The opening space or area of a valve port (i.e., each of intake and exhaust ports) is determined by only the amount of lift of the intake/exhaust valve, so the flow rate of the exhaust gas discharged from the cylinder and the flow rate of the fresh air sucked into the cylinder will be each limited to a predetermined flow rate.

(C) Influence of Residual Gas

Fresh air is not sucked in from the intake valve side (intake port) until the gas remaining in the cylinder after closure of the exhaust valve, and the internal EGR (the residual gas which has flowed out into the intake port) expand inside the cylinder so that the pressure thereof becomes equal to or less than the intake manifold pressure.

(D) Influence of Blow Back (the Overlap Region and the Partial Region)

At the time of the valve overlap in the partial region, the intake manifold pressure becomes less than the cylinder internal pressure, so that a blow back (an outflow of the internal EGR from the cylinder into the intake port) occurs, and fresh air is not sucked in until the amount of this blow back has been sucked in again.

(E) Influence of Blow Through (the Overlap Region and the WOT Region)

Inside the intake manifold, there always occurs pressure pulsation under the influence of opening and closing of the intake valve, and in cases where the intake manifold pressure (port part pressure) becomes larger than the cylinder internal pressure, at timing during the overlap in the WOT region, a blow-by occurs (fresh air pushes out the residual gas in the cylinder, whereby the amount of intake air is increased and the amount of internal EGR is decreased).

Thus, when the factors (A)-(E), by which the volumetric efficiency correction factor Kv varies according to the operating state of the engine 1, is intended to be represented by means of a rigorous physical model, a huge amount of calculation operation will be needed, as in the case of the above-mentioned first patent document.

In addition, by an investigation based on the rigorous physical model which can usually be considered, and the experimental data collected from engine tests, it has been found that in the case of solving it as the rigorous physical model, a good result can not be obtained due to many unknown physical quantities.

Accordingly, in the first embodiment of the present invention, a simpler physical model is built, only by paying attention to the internal state of the cylinder at the time of the end of the exhaust stroke, and at the time of the start of intake (suction) stroke.

In the following, reference will be made in detail to the simple physical model according to the first embodiment of the present invention.

In the first embodiment of the present invention, the volumetric efficiency correction factor Kv is calculated based on an exhaust efficiency which is an index indicating an amount of residual gas which is an exhaust gas after combustion at the time of the end of the exhaust stroke (i.e., at the time of the closure of the exhaust valve) remaining in the cylinder without being discharged from the cylinder to the exhaust manifold 13 (exhaust pipe), and an intake efficiency which is an index indicating an amount of fresh air coming into the cylinder from the intake pipe excluding the residual gas at the time of the end of the intake stroke (at the time of the end of the intake valve).

Here, note that, by taking into consideration the internal state of the cylinder at the time of the exhaust stroke and at the time of the intake stroke in this manner, the factor (D) of the influence of blow back and the factor (E) of the influence of blow-by among the above-mentioned factors (A)-(E) can be included into the factor (C) of the influence of residual gas, so that the physical model can be simplified.

Next, reference will be made to the cylinder internal state at the time of the exhaust/intake stroke of the engine 1, referring to FIGS. 4(a) through 4(c).

FIGS. 4(a) through 4(c) are explanatory views diagrammatically showing the internal states of the cylinder according to the first embodiment of the present invention, wherein FIG. 4(a) shows a cylinder internal state at the time of the closure of the exhaust valve, FIG. 4(b) shows a cylinder internal state at the time of the start of suction of fresh air, and FIG. 4(c) shows a cylinder internal state at the time of the end of the intake stroke, respectively.

First, reference will be made to the cylinder internal state at the time of the closure of the exhaust valve, as shown in FIG. 4(a).

There is timing (the timing of the effective closure of the exhaust valve) at which the outflow of exhaust gas to the exhaust port side stops completely before and after the designed closing timing of the exhaust valve.

Because the pressure of the residual gas remaining in the cylinder at the time of this effective closure of the exhaust valve is also strictly different from the pressure at the side of the exhaust port, i.e., the exhaust pressure Pex (approximately equal to an atmospheric pressure Pa), an internal volume Vexo [cm³] of the cylinder (hereinafter referred to as cylinder internal volume) and an internal pressure Pexo of the cylinder (hereinafter referred to as cylinder internal pressure) at the time of the effective closure of the exhaust valve are defined.

Here, note that because a problem with many unknown quantities is difficult to handle, in the following discussion, the volume of the internal EGR (hereinafter referred to as an internal EGR volume) at a point in time at which the internal EGR becomes equal to the exhaust pressure due to adiabatic compression or adiabatic expansion is defined as an assumed internal EGR volume Vex [cm³].

In addition, the cylinder internal pressure at the time of the effective closure of the exhaust valve is defined as an assumed cylinder internal pressure Pex (=the atmospheric pressure Pa approximately equal to the exhaust pressure), and the cylinder internal temperature at the time of the effective closure of the exhaust valve is defined as an assumed cylinder internal temperature Tex (=the temperature of the exhaust gas). Hereinafter, the temperature of the exhaust gas Tex is also referred to as an "exhaust temperature Tex" in an abbreviated form.

Moreover, a maximum internal capacity of the cylinder (the cylinder volume at bottom dead center) Vmax [cm³] and a clearance volume of the cylinder (the cylinder volume at top dead center) Vmin [cm³] are defined.

Next, reference will be made to the cylinder internal state at the time of the start of sucking fresh air, as shown in FIG. 4(b).

It is considered that in an intake stroke, fresh air is not sucked into the cylinder until the internal EGR remaining in the cylinder expands to become equal to or less than an intake manifold pressure Pb, and hence, a cylinder internal volume Vegro, which is occupied by the internal EGR at the time of the start of sucking fresh air (at the point in time at which the cylinder internal pressure becomes equal to the intake manifold pressure), is represented by the following expression (5) with the use of a polytrope number n.

[Expression 5]

$$p_{ex} \cdot V_{ex}^n = p_b \cdot V_{egro}^n \qquad (5)$$
$$\therefore V_{egro} = V_{ex} \cdot \left(\frac{p_{ex}}{p_b}\right)^{1/n}$$

However, the state represented by the expression (5) is a cylinder internal state before the suction of fresh air, in which the internal temperature, the internal pressure, and the density of a mixture in the cylinder (hereinafter referred to as a cylinder internal density) are all different in value from those in the actual internal state of the cylinder at the time of the end of the intake stroke after the suction of fresh air, and hence, can not be considered as the volume which is occupied by the internal EGR at the time of the end of the intake stroke.

Accordingly, as shown in FIG. 4(c), the volume occupied by the internal EGR at bottom dead center at the time of end of the intake stroke is calculated. Here, note that in FIG. 4(c), "@Tegr" indicates "the value of the cylinder internal volume at a temperature Tegr of the residual gas after having been subjected to adiabatic expansion", and "@Tin" indicates "the value of the cylinder internal volume at a cylinder internal temperature Tin at the time of the end of the intake stroke".

An internal EGR volume Vegr (refer to the left side of FIG. 4(c)) at the point in time at which the internal EGR (Vex, Pex, Tex) undergoes adiabatic expansion to become the cylinder internal pressure Pin at the time of end of the intake stroke is represented by the following expression (6).

[Expression 6]

$$p_{ex} \cdot V_{ex}^n = p_{in} \cdot V_{egr}^n \quad (6)$$

$$\therefore V_{egr} = V_{ex} \cdot \left(\frac{p_{ex}}{p_{in}}\right)^{1/n}$$

In addition, when the residual gas temperature Tegr (refer to the left side of FIG. 4(c)) after adiabatic expansion thereof is taken into consideration, it is represented by the following expression (7).

[Expression 7]

$$\frac{T_{ex}}{p_{ex}^{(n-1)/n}} = \frac{T_{egr}}{p_{in}^{(n-1)/n}} \quad (7)$$

$$\therefore T_{egr} = T_{ex} \cdot \left(\frac{p_{in}}{p_{ex}}\right)^{(n-1)/n}$$

When consideration is given to the internal EGR volume Vegr' (refer to the right side of FIG. 4(c)) at the point in time at which the interior of the cylinder is cooled by fresh air so that only the temperature in the cylinder changes to become the cylinder internal temperature Tin [degrees K] at the time of the end of the intake stroke, while the cylinder internal pressure remains constant, the calculation can be made, as shown by the following expression (8), according to Boyle Charles' law.

[Expression 8]

$$\frac{p_{in} \cdot V_{egr}}{T_{egr}} = \frac{p_{in} \cdot V_{egr'}}{T_{in}} \quad (8)$$

$$\therefore V_{egr'} = V_{egr} \cdot \frac{T_{in}}{T_{egr}}$$

$$= V_{ex} \cdot \frac{T_{in}}{T_{egr}} \cdot \left(\frac{p_{ex}}{p_{in}}\right)^{1/n}$$

$$= V_{ex} \cdot \frac{T_{in}}{T_{ex}} \cdot \left(\frac{p_{ex}}{p_{in}}\right)^{(n-1)/n} \cdot \left(\frac{p_{ex}}{p_{in}}\right)^{1/n}$$

$$= V_{ex} \cdot \frac{T_{in}}{T_{ex}} \cdot \frac{p_{ex}}{p_{in}}$$

$$= V_{ex'} \cdot \frac{p_{ex}}{p_{in}} \left(V_{ex'} = V_{ex} \cdot \frac{T_{in}}{T_{ex}}\right)$$

In this manner, an internal EGR volume Vex', which is obtained by temperature correction of the residual gas volume Vex, becomes an assumed residual gas volume after the suction of fresh air (an assumed residual gas volume after correction).

From the above, an actual fresh air volume Vnew' (refer to the right side of FIG. 4(c)), which has been finally sucked in at the time of the end of the intake stroke, is represented by the following expression (9).

[Expression 9]

$$V_{new'} = V_{max} - V_{egr'} = V_{max} - V_{ex'} \cdot \frac{p_{ex}}{p_{in}} \quad (9)$$

Next, a consideration is given to the amount of intake air sucked into the cylinder.

First of all, in FIG. 4(c), a cylinder internal density (i.e., the density of the mixture in the cylinder) ρ in(n) [g/cm³] at the time of the end of the intake stroke and a cylinder internal pressure Pin(n)[kPa] at the time of the end of the intake stroke are defined.

At this time, the cylinder intake air amount Qc(n)T(n) for one stroke is represented by the following expression (10), with the use of a gas constant R.

[Expression 10]

$$Qc(n)T(n) = \rho_{in}(n) \cdot V_{new'} = \frac{p_{in}(n)}{RT_{in}} \cdot V_{new'} \; (\because p_{in} = \rho_{in} R T_{in}) \quad (10)$$

Here, assuming that a ratio between a cylinder internal mass ρ in·Vnew' of the actual fresh air volume Vnew' (an amount of intake air which has actually entered the cylinder) at the time of the end of the intake stroke, and an intake manifold fresh air mass ρ b·Vnew' (an amount of intake air which is estimated to have entered the cylinder when the volumetric efficiency is 100%) is an intake efficiency Kin, the volumetric efficiency correction coefficient Kv is represented, as shown in the following expression (11), from expression (10) above and the above-mentioned expression (2).

[Expression 11]

$$Kv = \frac{Qc(n)T(n)}{\rho_b(n) \cdot Vc} = \frac{\rho_{in}(n)}{\rho_b(n)} \cdot \frac{V_{new'}}{Vc} = \frac{K_{in}}{Vc} \cdot \left(V_{max} - V_{ex'} \cdot \frac{p_{ex}}{p_{in}}\right) \quad (11)$$

$$\left(\because K_{in} = \frac{\rho_{in} \cdot V_{new'}}{\rho_b \cdot V_{new'}} = \frac{p_{in}}{p_b} \cdot \frac{T_b}{T_{in}}\right)$$

However, expression (11) above includes a stroke volume Vc, a maximum volume Vmax, and a corrected assumed residual gas volume Vex', so in particular, in engines which are different in displacement from one another, there will be a difference in set values. Accordingly, normalization is carried out so that description can be made by using a compression ratio ε.

At this time, the relation between the individual volumes in the cylinder and the compression ratio ε is represented by the following expression (12).

[Expression 12]

$$\varepsilon = \frac{V_{max}}{V_{min}}, \; V_{max} = Vc + V_{min} \quad (12)$$

$$\therefore \frac{V_{min}}{Vc} = \frac{1}{\varepsilon - 1}, \; \frac{V_{max}}{Vc} = \frac{\varepsilon}{\varepsilon - 1}$$

Accordingly, the volumetric efficiency correction coefficient Kv is also represented, as shown in the following expression (13), from the above-mentioned expression (11) and the expression (12) above.

[Expression 13]

$$Kv = \frac{K_{in}}{Vc} \cdot \left(V_{max} - V_{ex'} \cdot \frac{p_{ex}}{p_{in}}\right) \quad (13)$$

$$= K_{in} \cdot \left(\frac{V_{max}}{Vc} - \frac{V_{ex}}{Vc} \cdot \frac{p_{ex}}{p_{in}} \cdot \frac{T_{in}}{T_{ex}}\right)$$

$$= K_{in} \cdot \left(\frac{V_{max}}{Vc} - \frac{V_{ex}}{V_{min}} \cdot \frac{p_{ex}}{p_{in}} \cdot \frac{T_{in}}{T_{ex}} \cdot \frac{V_{min}}{Vc}\right)$$

$$= K_{in} \cdot \left(\frac{\varepsilon}{\varepsilon - 1} - K_{ex} \cdot \frac{1}{\varepsilon - 1}\right)$$

$$\left(\because K_{ex} = \frac{V_{ex}}{V_{min}} \cdot \frac{p_{ex}}{p_{in}} \cdot \frac{T_{in}}{T_{ex}} = \frac{\rho_{ex}}{\rho_{in}} \cdot \frac{V_{ex}}{V_{min}}\right)$$

Here, note that in the expression (13), the ratio of a mass of exhaust gas ρ ex·Vex (an actual amount of residual gas) in the assumed residual gas volume Vex after the end of the exhaust stroke and a mass of exhaust gas ρ in·Vmin at the time when the gas in the cylinder of the clearance volume at the time of the end of the intake stroke remains as a residual gas is used as an exhaust efficiency Kex.

Further, because the volume for the internal EGR at the time of the end of the intake stroke is calculated, the internal EGR rate Regr can be calculated from the ratio of the mass for the internal EGR at this point in time, and the mass of all the gas in the cylinder, as shown in the following expression (14).

[Expression 14]

$$R_{egr} = \frac{\rho_{in} \cdot V_{egr'}}{\rho_{in} \cdot V_{max}}$$
$$= \frac{V_{ex}}{V_{max}} \cdot \frac{T_{in}}{T_{ex}} \cdot \frac{p_{ex}}{p_{in}}$$
$$= K_{ex} \cdot \frac{V_{min}}{V_{max}}$$
$$= \frac{K_{ex}}{\varepsilon}$$

(14)

When the expression (13) and the expression (14) which serve to calculate the volumetric efficiency correction factor Kv and the internal EGR rate Regr, respectively, as mentioned above, are rearranged and rewritten, they become the following expression (15).

[Expression 15]

$$Kv = K_{in} \cdot \left( \frac{\varepsilon}{\varepsilon - 1} - K_{ex} \cdot \frac{1}{\varepsilon - 1} \right)$$
$$R_{egr} = \frac{K_{ex}}{\varepsilon}$$

(15)

As is clear from expression (15) above, in order to calculate the volumetric efficiency correction factor Kv and the internal EGR rate Regr, it is necessary to obtain the intake efficiency Kin and the exhaust efficiency Kex.

In order to calculate the intake efficiency Kin and the exhaust efficiency Kex, there can be considered a method of storing, as maps, an engine rotational speed Ne, the intake manifold pressure, and the phase angles of the intake VVT 10 and the exhaust VVT 11.

However, if maps with many parameters are stored, as mentioned above, the number of the maps becomes huge, and such a method is not different at all from conventional techniques (i.e., preparation of maps of the volumetric efficiency correction factor Kv), and hence, in the first embodiment of the present invention, approximate calculation processing is carried out.

In the following, reference will be made in detail to the approximate calculation processing of the intake efficiency Kin and the exhaust efficiency Kex according to the first embodiment of the present invention.

First, in the expression (11) which serves to calculate the volumetric efficiency correction factor Kv, the intake efficiency Kin is defined, as shown in the following expression (16).

[Expression 16]

$$K_{in} = \frac{p_{in}}{p_b} \cdot \frac{T_b}{T_{in}}$$

(16)

Expression (16) above shows that the intake efficiency Kin can be calculated, when using the cylinder internal pressure Pin and the cylinder internal temperature Tin which are calculated by using the cylinder internal pressure and the exhaust temperature, in addition to the intake manifold pressure Pb and the intake manifold temperature Tb. However, since these physical quantities (the cylinder internal pressure Pin and the cylinder internal temperature Tin) are parameters which are not used in conventional engine control, it is necessary to estimate the cylinder internal pressure Pin and the cylinder internal temperature Tin by the use of physical quantities which can be used for engine control.

First, reference will be made to the calculation processing of the cylinder internal pressure Pin at the time of the end of the intake stroke, while referring to FIG. 5.

Figure 5:
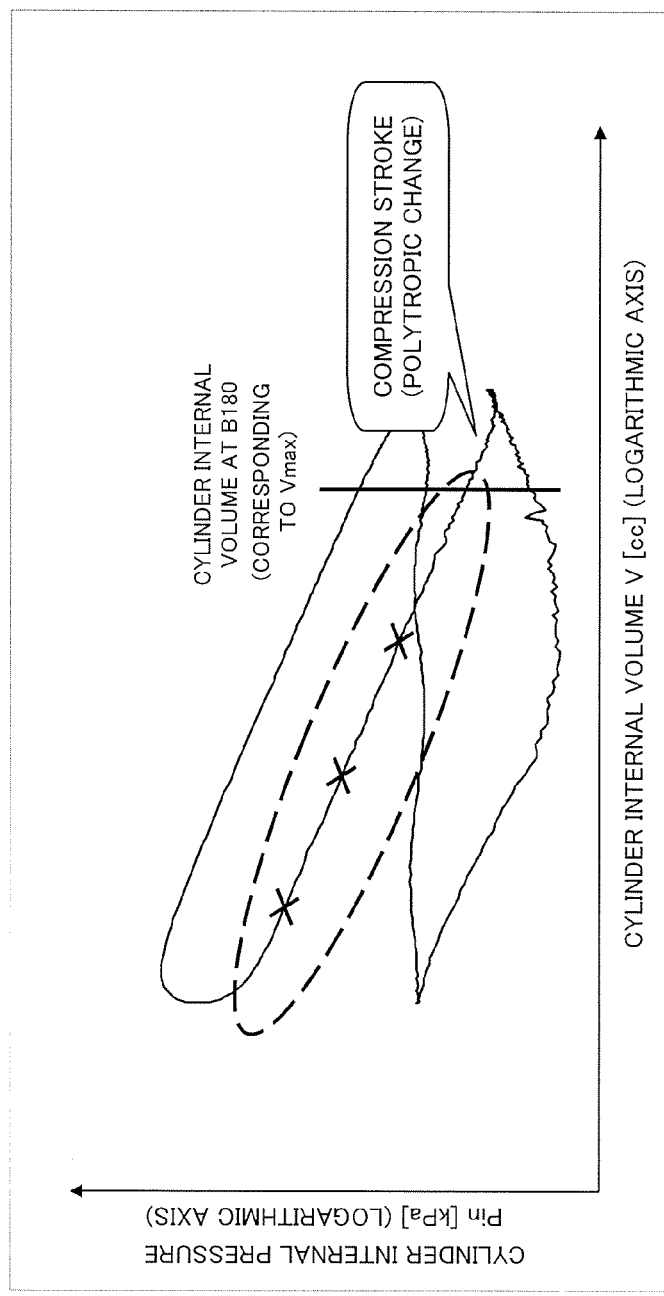
FIG. 5 is an explanatory view showing an example of the relation between an internal pressure in a cylinder and an internal volume thereof (a P-V diagrammatic view in bi-logarithmic representation) according to the first embodiment of the present invention.

FIG. 5 is an explanatory view showing an example of the relation between an internal pressure in a cylinder measured by a cylinder internal pressure sensor (not shown) and an internal volume thereof (a P-V diagrammatic view in bi-logarithmic representation).

In FIG. 5, an axis of abscissa represents the cylinder internal volume V [cc] (logarithmic axis), and an axis of ordinate represents the cylinder internal pressure Pin [kPa] (logarithmic axis), wherein a region surrounded by a broken line represents the compression stroke.

Here, the change of state in the compression stroke without combustion is known as a polytropic change, and is in general represented by the following expression.

[Expression 17]

$$PV^n = C(\text{cons tan } t)$$

$$\therefore \log P = -n \log V + \log C$$

(17)

Here, note that the polytropic change means that in cases where an air fuel mixture or combustion gas is compressed, a part of heat is actually taken by outside air, cooling water, etc., and hence, the relation between the pressure and the temperature is carried out by an intermediate change between an isothermal change and an adiabatic change.

As is clear from FIG. 5, when the change of state before combustion is considered according to a log-log coordinate system, it is represented by a linear (first-order) function with a slope of −n (n being a polytropic index which is approximately 1.3-1.4), as shown by the broken line region.

Accordingly, in order to calculate the cylinder internal pressure Pin at the time of the end of the intake stroke (B180), it is just necessary to estimate the cylinder internal pressure at a location corresponding to B180 from each of several points before ignition (before combustion) (e.g., locations indicated by x in the broken line region), and to obtain an average value thereof.

Figure 6:
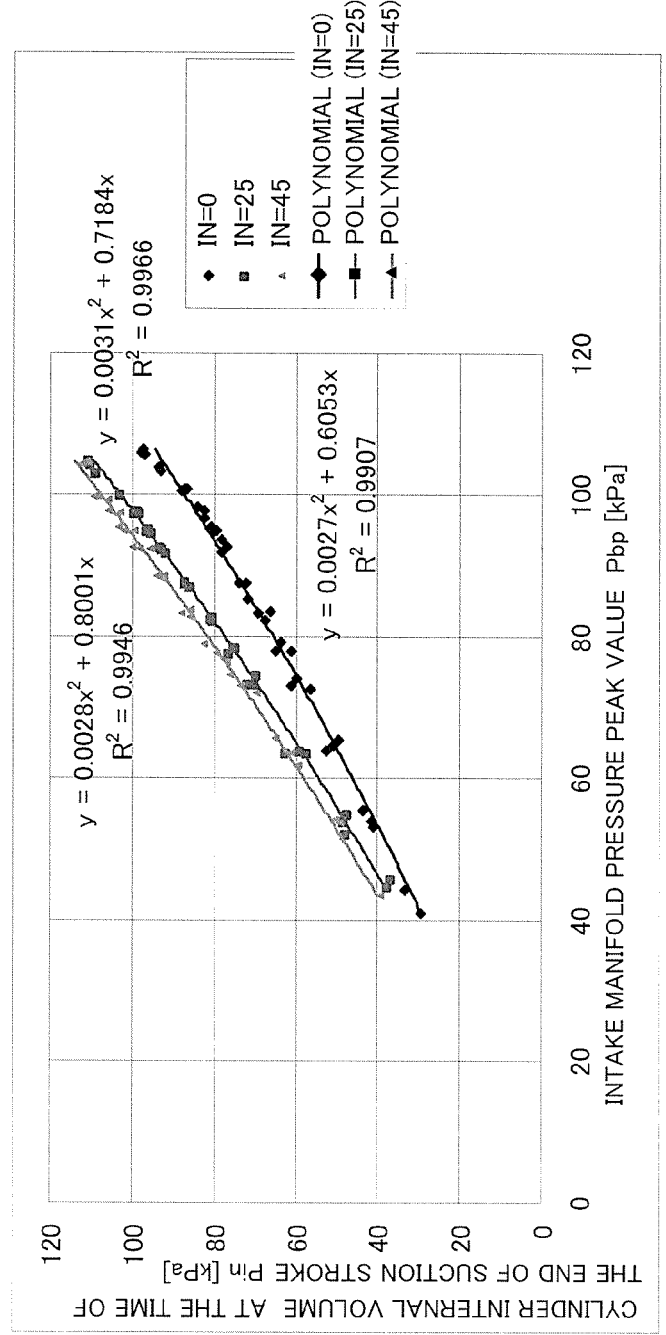
FIG. 6 is an explanatory view showing the relation between an intake manifold pressure peak value and an internal pressure in a cylinder at the time of the end of intake stroke according to the first embodiment of the present invention.

FIG. 6 is an explanatory view showing the relation between the cylinder internal pressure Pin at the time of the end of the intake stroke calculated as mentioned above and the intake manifold pressure.

In FIG. 6, an axis of abscissa represents the intake manifold pressure peak value (the maximum value between prescribed crank angles (e.g., between adjacent B05)) Pbp [kPa], and an axis of abscissa represents the cylinder internal pressure Pin [kPa] at the time of the end of the intake stroke, wherein the characteristics according to differences in numerical values IN (=0, 25, 45) indicating phase angles InVVT of the intake VVT 10 are shown by polynomials (lines) along points of black rhombuses, black rectangles, and black triangles, respectively.

Here, the reason for having used not an intake manifold pressure average value (an average value of the intake manifold pressure in a period of time between prescribed crank angles (e.g., between adjacent B05)) but an intake manifold pressure peak value Pbp is that a better correlation has been obtained by using the intake manifold pressure peak value rather than the intake manifold pressure average value.

Accordingly, in the following description, the intake manifold pressure peak value Pbp is to be used as the intake manifold pressure Pb.

Here, note that FIG. 6 is a view in which no consideration is given to the exhaust VVT 11, so an arrangement is carried out only with the intake VVT 10 without regard to the exhaust VVT 11.

As is clear from the characteristics (polynomials) of FIG. 6, it is understood that the cylinder internal pressure Pin at the time of the end of the intake stroke can be approximated by a quadratic (second-order) function of the intake manifold pressure peak value Pbp which passes through an origin point, for each intake VVT 10 without regard to the exhaust VVT 11.

At this time, the cylinder internal pressure Pin at the time of the end of the intake stroke is represented as shown by the following expression (18).

[Expression 18]

$$P_{in} = A \cdot P_{bp}^2 + B \cdot P_{bp} \quad (18)$$

$$\therefore \frac{P_{in}}{P_{bp}} = A \cdot P_{bp} + B$$

After all, a pressure ratio Pin/Pbp of the cylinder internal pressure Pin at the time of the end of the intake stroke with respect to the intake manifold pressure peak value Pbp (intake pipe internal pressure) can be approximated by a linear function of the intake manifold pressure peak value Pbp.

The reason for which the pressure ratio Pin/Pbp can be calculated in such a form is that it can be said that the pressure ratio Pin/Pbp is an index indicating a pressure ratio at which a gas is pushed into the cylinder, when the intake manifold pressure peak value Pbp is a predetermined value.

That is, it is considered that the pressure ratio Pin/Pbp is represented by the phase angle InVVT of the intake VVT 10 in connection with the intake valve and an open period of time of the intake valve (∞ the engine rotational speed Ne), without regard to an overlap amount in connection with the exhaust valve or the phase angle InVVT of the exhaust VVT 11. In addition, it is also considered that the pressure ratio Pin/Pbp does not influence the exhaust pressure Pex (=atmospheric pressure Pa), either.

On the other hand, the cylinder internal temperature Tin can be calculated from the intake manifold temperature Tb, the exhaust temperature Tex, and the internal EGR rate Regr, as shown by the following expression (19).

[Expression 19]

$$T_{in} = (1 - R_{egr}) \times T_b + R_{egr} \times T_{ex} \quad (19)$$

Here, for the exhaust temperature Tex, a map may be set based on measured values (e.g., a map may be created based on the engine rotational speed Ne and the intake manifold pressure), or it may be calculated from an index such as a thermal efficiency, which is separately calculated for engine control, or still more simply, it may also be set as a fixed value (e.g., about 800 degrees C.).

In addition, it is also necessary to calculate the internal EGR rate Regr, but the internal EGR rate Regr can be calculated from the above-mentioned expression (15). Here, note that in the case of using the expression (15), it is just necessary to calculate in advance the exhaust efficiency Kex to be described later.

According to the above, there will be no unknowns, so it becomes possible to carry out approximate calculation of the intake efficiency Kin from the expression (16).

Next, the approximate calculation processing of the exhaust efficiency Kex will be explained.

First, in the expression (13), the exhaust efficiency Kex is defined as shown by the following expression (20).

[Expression 20]

$$K_{ex} = \frac{V_{ex}}{V_{min}} \cdot \frac{p_{ex}}{p_{in}} \cdot \frac{T_{in}}{T_{ex}} \quad (20)$$

In the expression (20), the exhaust temperature Tex and the cylinder internal pressure Pin at the time of the end of the intake stroke are obtained at the time of calculation of the intake efficiency Kin, and the assumed cylinder internal pressure Pex can be replaced by the atmospheric pressure Pa, but it is necessary to newly calculate the assumed residual gas volume Vex.

In addition, it is also necessary to use the cylinder internal temperature Tin (refer to the expression (19)) which is calculated by the use of the internal EGR rate Regr.

Accordingly, in order to calculate the exhaust efficiency Kex without the use of the cylinder internal temperature Tin, first, the expression (16) is assigned in the expression (15), whereby the following expression (21) is obtained.

[Expression 21]

$$K_v = K_{in} \cdot \left( \frac{\varepsilon}{\varepsilon - 1} - K_{ex} \cdot \frac{1}{\varepsilon - 1} \right) \quad (21)$$

$$\frac{K_v}{K_{in}} + \frac{K_{ex}}{\varepsilon - 1} = \frac{\varepsilon}{\varepsilon - 1}$$

$$\frac{K_v \cdot p_b}{p_{in} \cdot T_b} \cdot T_{in} + \frac{K_{ex}}{\varepsilon - 1} = \frac{\varepsilon}{\varepsilon - 1}$$

Here, when the cylinder internal temperature Tin is represented from the expression (19) by the use of the exhaust efficiency Kex, in order to eliminate the cylinder internal temperature Tin, the following expression (22) results.

[Expression 22]

$$T_{in} = (1 - R_{egr}) \times T_b + R_{egr} \times T_{ex} \quad (22)$$

$$= \left(1 - \frac{K_{ex}}{\varepsilon}\right) \times T_b + \frac{K_{ex}}{\varepsilon} \times T_{ex}$$

$$= \frac{K_{ex}}{\varepsilon} \cdot (T_{ex} - T_b) + T_b$$

In the following, when the expression (22) is assigned in the expression (21), the following expression (23) results.

[Expression 23]

$$\frac{K_v \cdot p_b}{p_{in} \cdot T_b} \cdot \left\{ \frac{K_{ex}}{\varepsilon} \cdot (T_{ex} - T_b) + T_b \right\} + \frac{K_{ex}}{\varepsilon - 1} = \frac{\varepsilon}{\varepsilon - 1} \quad (23)$$

$$\frac{K_v \cdot p_b}{p_{in} \cdot T_b} \cdot \frac{K_{ex}}{\varepsilon} \cdot (T_{ex} - T_b) + \frac{K_{ex}}{\varepsilon - 1} = \frac{\varepsilon}{\varepsilon - 1} - \frac{K_v \cdot p_b}{p_{in}}$$

$$\therefore K_{ex} = \frac{\frac{\varepsilon}{\varepsilon - 1} - \frac{K_v \cdot p_b}{p_{in}}}{\frac{K_v \cdot p_b}{p_{in} \cdot T_b} \cdot \frac{(T_{ex} - T_b)}{\varepsilon} + \frac{\varepsilon}{\varepsilon - 1}}$$

$$= \frac{\varepsilon \cdot p_{in} - (\varepsilon - 1) \cdot K_v \cdot p_b}{K_v \cdot p_b \cdot \left(\frac{T_{ex}}{T_b} - 1\right) \cdot \frac{\varepsilon - 1}{\varepsilon} + p_{in}}$$

According to the expression (23), the exhaust efficiency Kex can be obtained from the volumetric efficiency correction factor Kv, the cylinder internal pressure Pin, the intake manifold pressure Pb, etc., without the use of the cylinder internal temperature Tin.

When the exhaust efficiency Kex is calculated, the internal EGR rate Regr will become able to be calculated from the expression (15), and the cylinder internal temperature Tin will become able to be calculated from the expression (19).

However, the expression (23) includes the volumetric efficiency correction factor Kv which is an unknown quantity, and hence, as a matter of course, it can not be used for the control of the engine 1.

Accordingly, the exhaust efficiency Kex has been calculated in advance by using the expression (23), and the exhaust efficiency Kex is calculated in an approximate manner.

Figure 7:
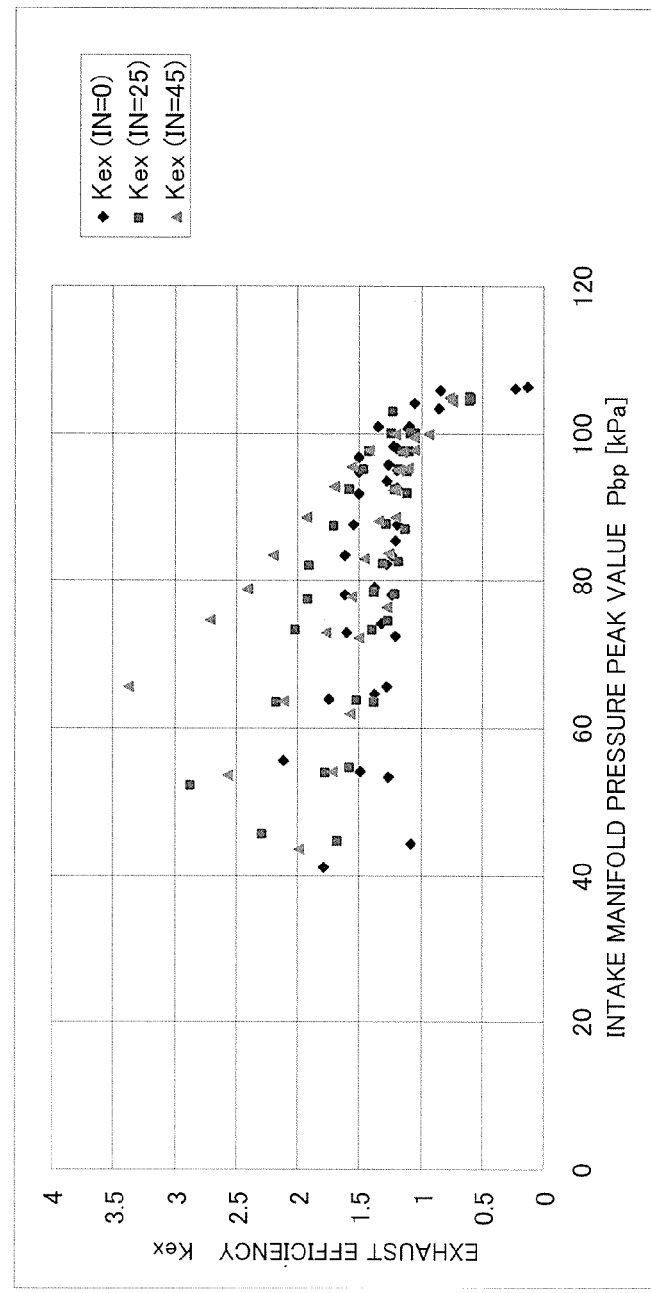
FIG. 7 is an explanatory view showing the relation between an intake manifold pressure peak value and an exhaust efficiency according to the first embodiment of the present invention.

FIG. 7 is an explanatory view showing the relation between the intake manifold pressure peak value Pbp [kPa] (an axis of abscissa), which is calculated by the use of the expression (23), and the exhaust efficiency Kex (an axis of ordinate).

Here, note that FIG. 7 is a view in which no consideration is given to the exhaust VVT 11, as in FIG. 6, so an arrangement is carried out only with the intake VVT 10 without regard to the exhaust VVT 11.

However, unlike in FIG. 6, in the case of FIG. 7, it is shown that there is a tendency which varies with the exhaust VVT 11, too.

As is clear from FIG. 7, it will be understood that the exhaust efficiency Kex has a very good or strong relation with the intake manifold pressure peak value Pbp until when Pbp=45-95 [kPa] or therearound, but has a weakened or poor relation therewith at Pbp=100 [kPa] or above.

Accordingly, the exhaust efficiency Kex is subjected to linear approximation, and the weakened portion at Pbp=100 [kPa] or above is corrected in a separate manner.

Figure 8:
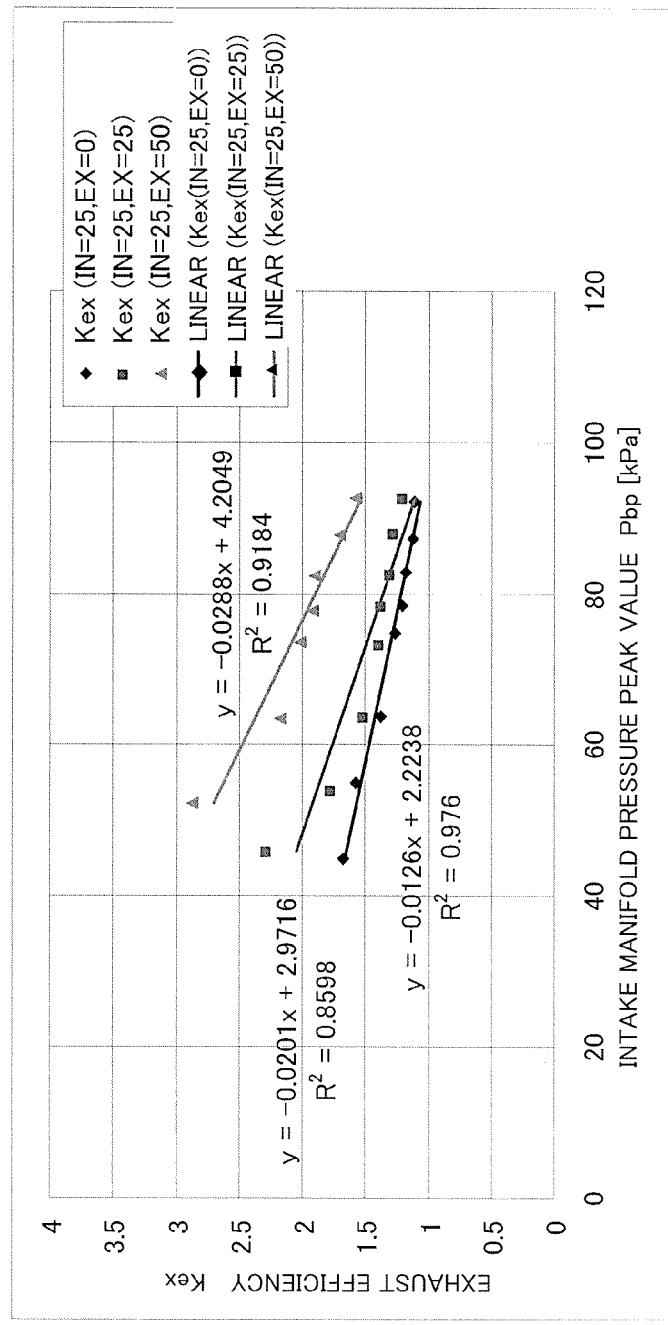
FIG. 8 is an explanatory view showing the relation between an intake manifold pressure peak value and an exhaust efficiency in the case where a phase angle of an exhaust VVT has changed at a predetermined phase angle of an intake VVT) according to the first embodiment of the present invention.

FIG. 8 is an explanatory view showing the relation between the intake manifold pressure peak value Pbp [kPa] (an axis of abscissa) and the exhaust efficiency Kex (an axis of ordinate) in the case where a phase angle ExVVT of the exhaust VVT 11 has changed at a predetermined phase angle InVVT of the intake VVT 10.

As is clear from FIG. 8, it can be understood that the intake manifold pressure peak value Pbp can be approximated by a linear function in a good manner until when it is about 45-95 [kPa].

Figure 9:
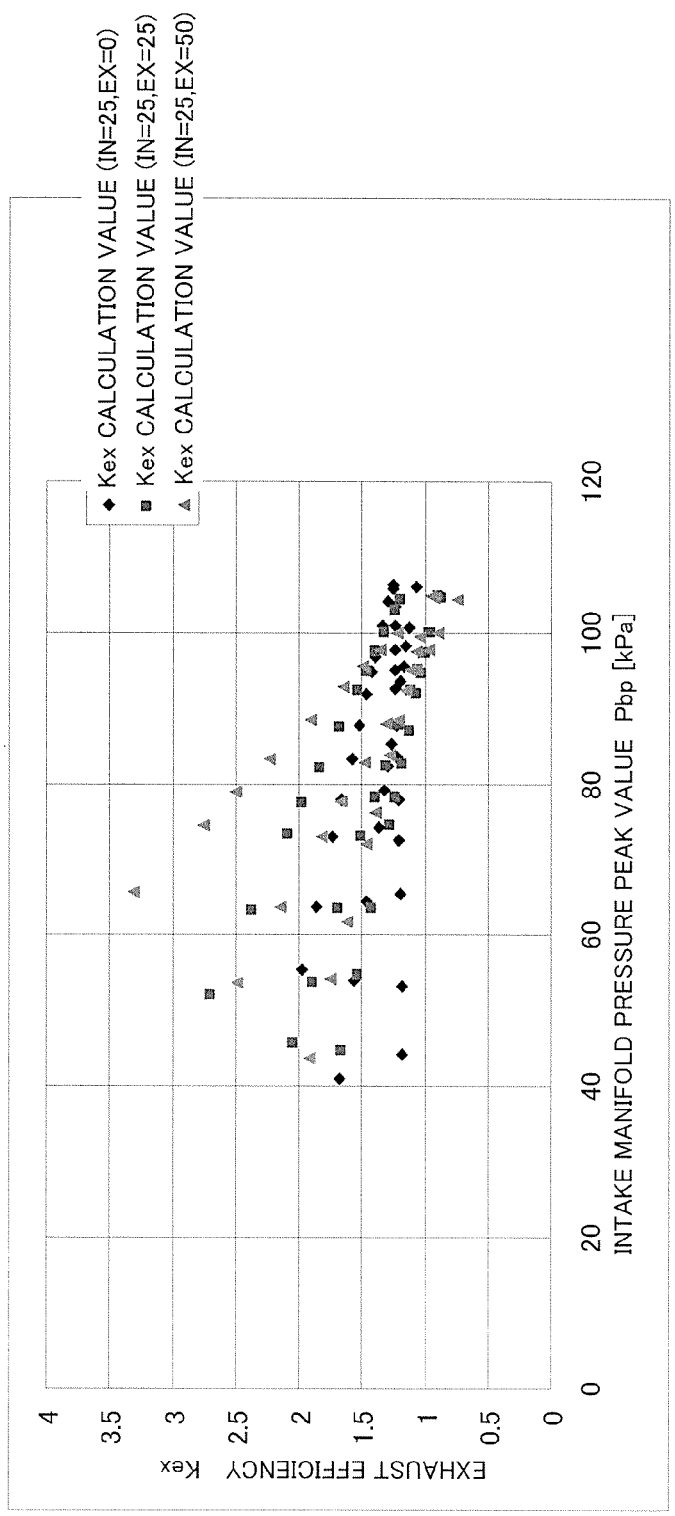
FIG. 9 is an explanatory view showing linear approximation of the relation between an intake manifold pressure peak value and an exhaust efficiency in the case where the phase angle of the exhaust VVT has changed at a predetermined phase angle of an intake VVT) according to the first embodiment of the present invention.

FIG. 9 is an explanatory view showing linear approximation of the relation between the intake manifold pressure peak value Pbp (an axis of abscissa) and the exhaust efficiency Kex (an axis of ordinate) in the case where the phase angle InVVT of the exhaust VVT 10 and the phase angle ExVVT of the intake VVT 11 have changed.

Figure 10:
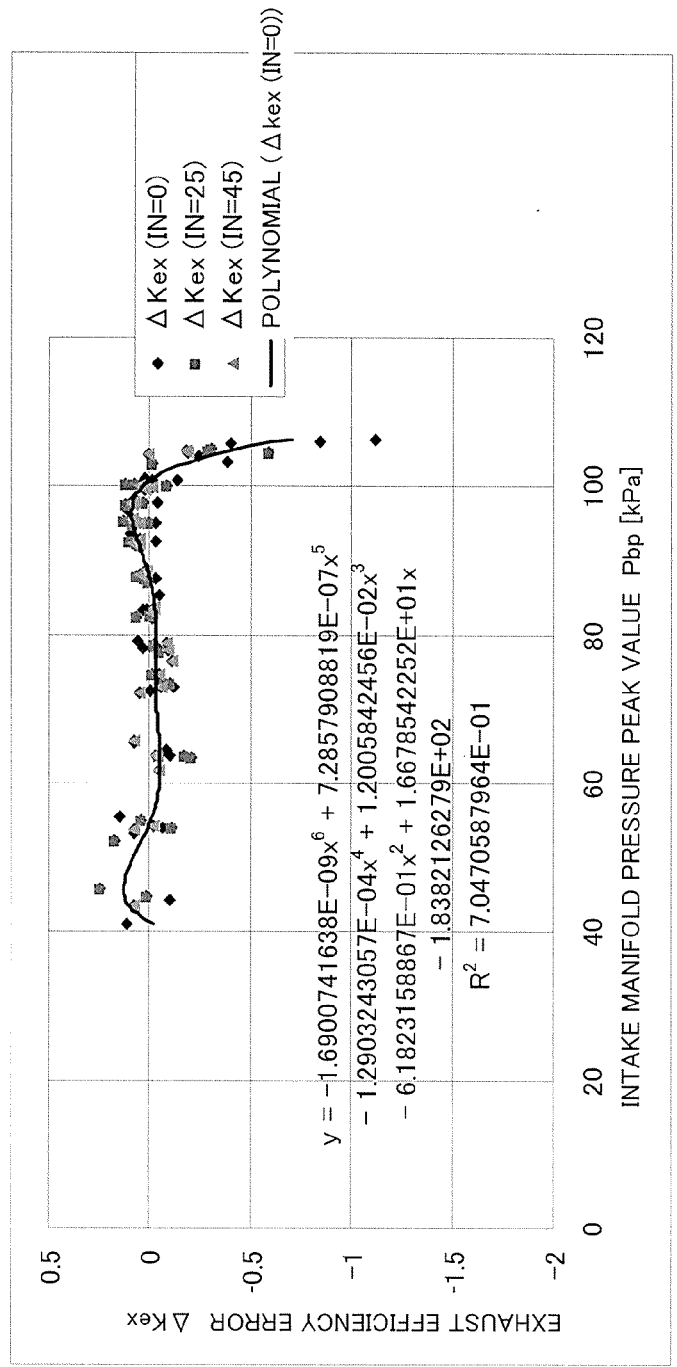
FIG. 10 is an explanatory view showing an error or difference between a calculated value of an exhaust efficiency and a linear approximation value thereof according to the first embodiment of the present invention.

FIG. 10 is an explanatory view which shows an error (hereinafter referred to as an exhaust efficiency error) ΔKex between the calculation value (FIG. 7) of the exhaust efficiency Kex, and the linear approximation value (FIG. 9) of the exhaust efficiency Kex, wherein an axis of abscissa represents the intake manifold pressure peak value Pbp [kPa], and an axis of ordinate represents the exhaust efficiency error ΔKex.

As shown in FIG. 9, the results of linear approximation carried out are also obtained at phase angles InVVT of the intake VVT 10 and at phase angles ExVVT of the exhaust VVT 11 other than the predetermined phase angles thereof.

In addition, as shown in FIG. 10, the exhaust efficiency error ΔKex is substantially constant without regard to the individual phase angles InVVT and ExVVT, respectively.

As a result, the exhaust efficiency Kex can be calculated in a good manner by correcting the linear approximation value by the use of the exhaust efficiency error Δ Kex, which has been subjected to the polynomial approximation shown in FIG. 10.

As described above, as a function of the volumetric efficiency correction factor calculation unit 22 in the cylinder intake air amount calculation unit 21, calculation processing of the intake efficiency Kin and the exhaust efficiency Kex and calculation processing of the volumetric efficiency correction factor Kv and the internal EGR rate Regr using the intake efficiency Kin and the exhaust efficiency Kex are carried out.

Next, reference will be made in detail to the specific processing function of the volumetric efficiency correction factor calculation unit 22, while referring to FIG. 11 through FIG. 14.

Figure 11:
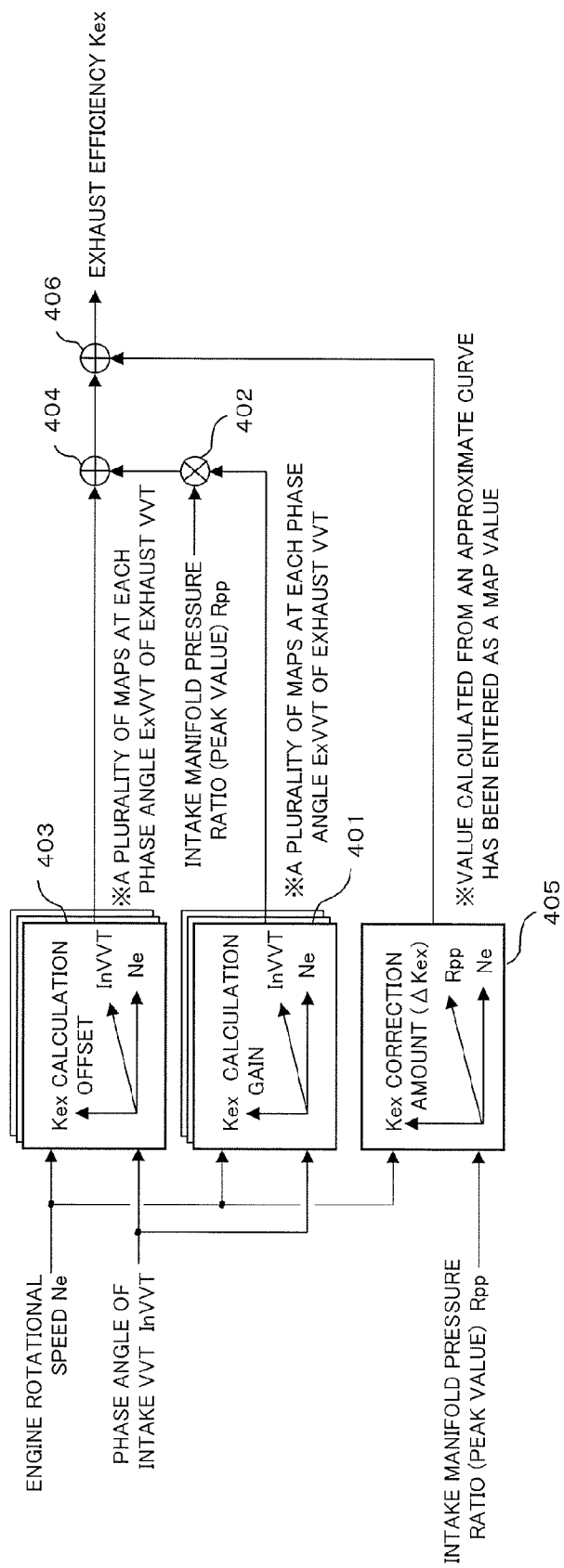
FIG. 11 is a functional block diagram showing a calculation part for an exhaust efficiency according to the first embodiment of the present invention.
Figure 12:
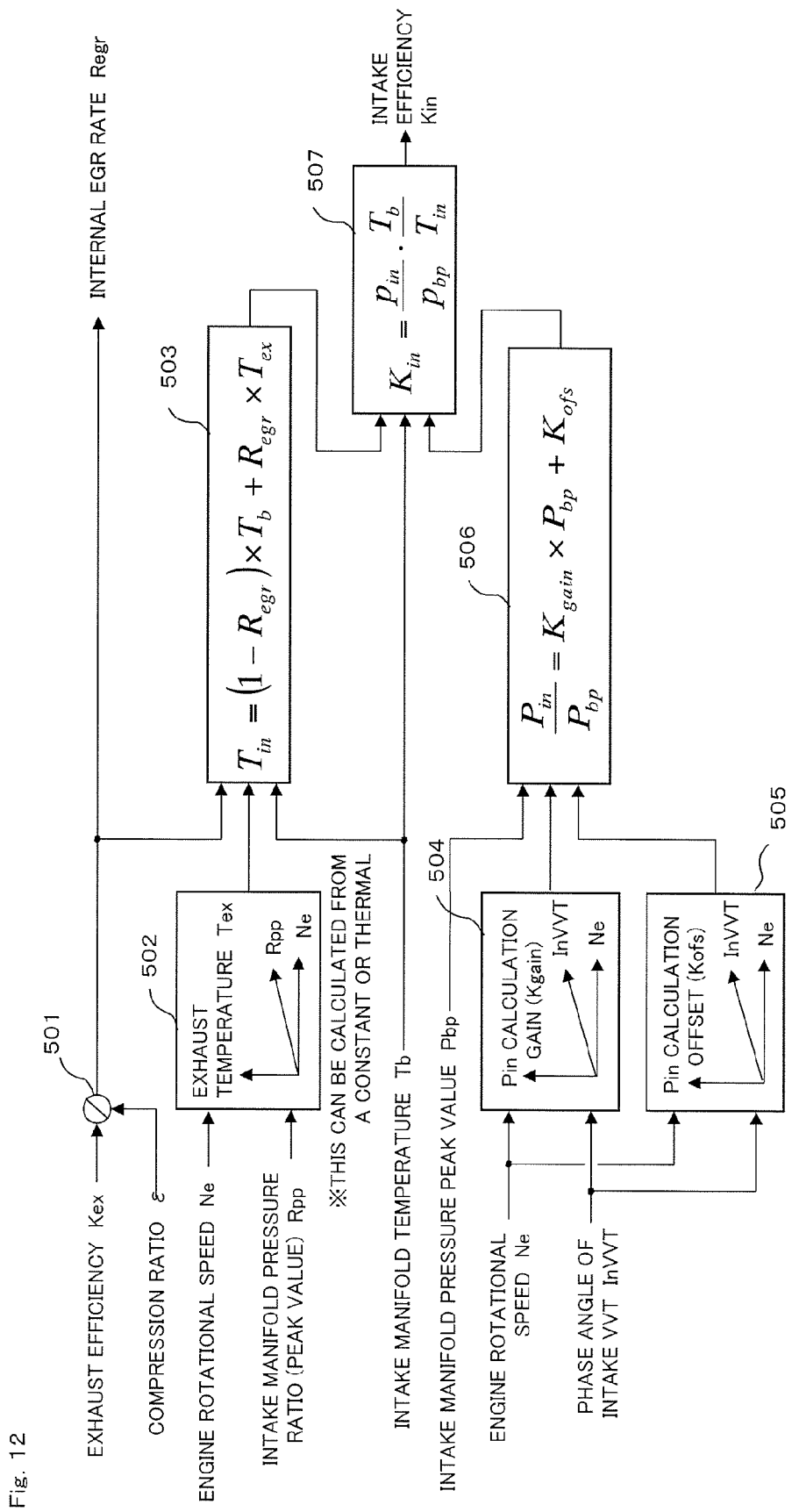
FIG. 12 is a functional block diagram showing a calculation part for an internal EGR rate and an intake efficiency according to the first embodiment of the present invention.
Figure 13:
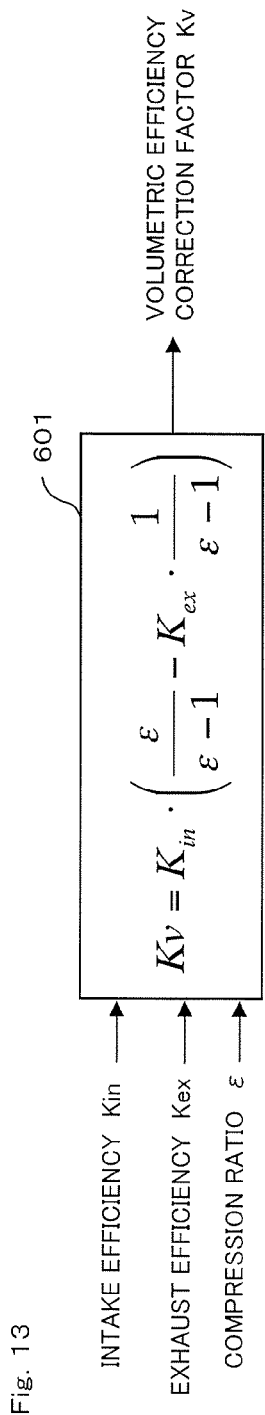
FIG. 13 is a functional block diagram showing a calculation part for a volumetric efficiency correction factor according to the first embodiment of the present invention.

FIG. 11 is a functional block diagram showing a calculation part which serves to calculate the exhaust efficiency Kex. FIG. 12 is a functional block diagram showing a calculation part which serves to calculate the internal EGR rate Regr and the of the intake efficiency Kin. FIG. 13 is a functional block diagram showing a calculation part which serves to calculate the volumetric efficiency correction factor Kv.

Figure 14:
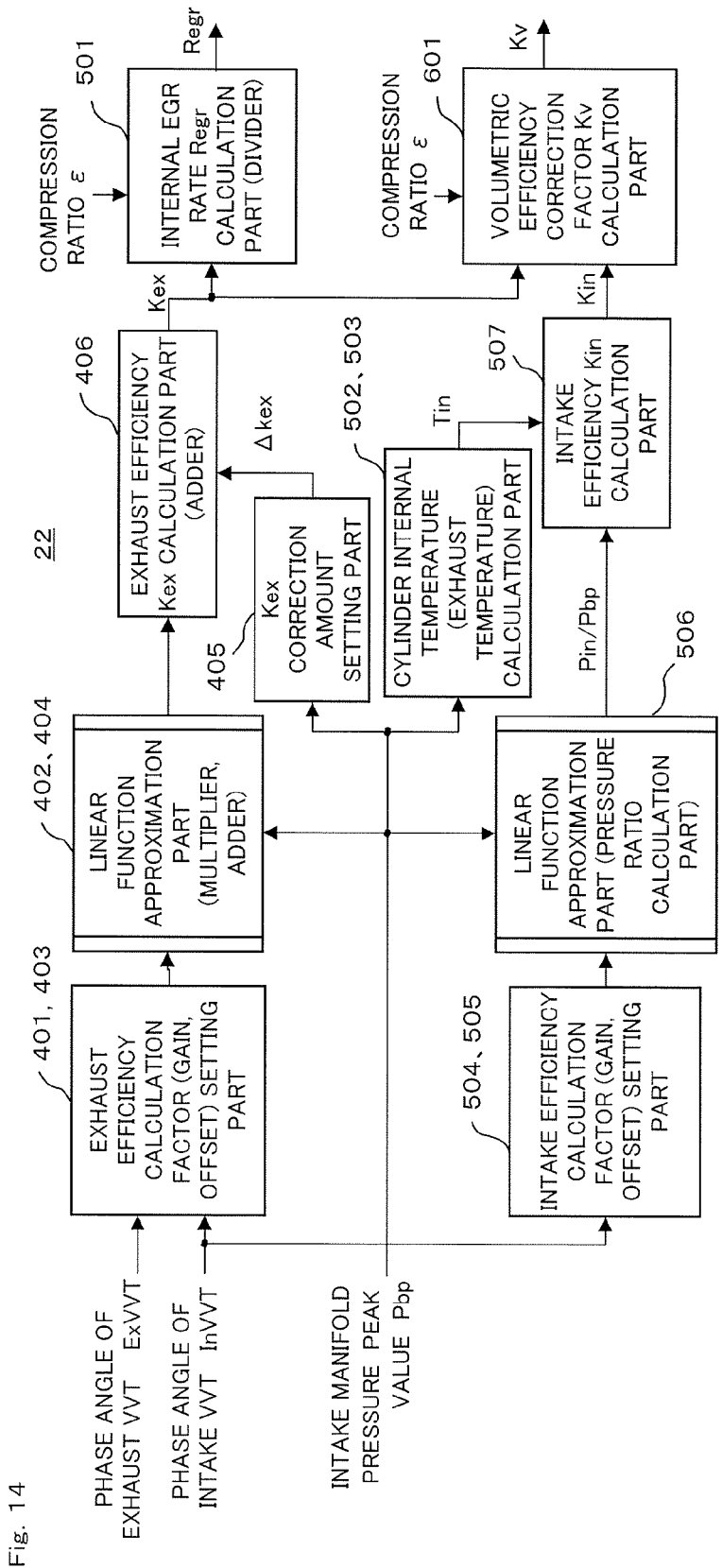
FIG. 14 is a functional block diagram showing an overall construction of a volumetric efficiency correction factor calculation unit according to the first embodiment of the present invention.

In addition, FIG. 14 is a functional block diagram showing an overall construction of the volumetric efficiency correction factor calculation unit 22 according to the first embodiment of the present invention. FIG. 14 shows the individual calculation parts (arithmetic operation contents) of FIG. 11 through FIG. 13 in a comprehensive manner. Here, note that in FIG. 14, the blocks with the same functions as in FIG. 11 through FIG. 13 are attached with the same symbols.

In FIG. 14, the volumetric efficiency correction factor calculation unit 22 is provided with: an exhaust efficiency calculation factor setting part (a calculation gain setting part 401 and a calculation offset setting part 403); a linear function approximation part (a multiplier 402 and an adder 404); a Kex correction amount setting part 405; an exhaust efficiency calculation part (an adder 406); an internal EGR rate calculation part (a divider 501); a cylinder internal temperature calculation part (exhaust temperature setting parts 502, 503); an intake efficiency calculation factor setting part (a calculation gain setting part 504 and a calculation offset setting part 505); a linear function approximation part (a pressure ratio calculation part 506); an intake efficiency calculation part 507; and a volumetric efficiency correction factor calculation part 601.

First, the calculation part for the exhaust efficiency Kex will be explained, while referring to FIG. 11 and FIG. 14.

In FIG. 11, the calculation part for the exhaust efficiency Kex is provided with: the Kex calculation gain setting part 401 that serves to set a Kex calculation gain based on a map of the engine rotational speed Ne and the phase angle InVVT of the intake VVT 10; the Kex calculation offset setting part 403 that serves to set a Kex calculation offset based on the map of the engine rotational speed Ne and the phase angle InVVT of the intake VVT 10; the Kex correction amount setting part 405 that serves to set a Kex correction amount based on a map of the engine rotational speed Ne and an intake manifold pressure ratio (peak value) Rpp; the multiplier 402 that multiplies the set value of the Kex calculation gain by the intake manifold pressure ratio (peak value) Rpp; the adder 404 that adds the set value of the Kex calculation offset and the result of the multiplication of the multiplier 402 to each other; and the adder 406 that calculates the exhaust efficiency Kex by adding the set value of the Kex correction amount (ΔKex) and the result of the addition of the adder 404.

In the Kex calculation gain setting part 401 and the Kex calculation offset setting part 403, the map of the engine rotational speed Ne and the phase angle InVVT of the intake VVT 10 is further set in plurality for every phase angle ExVVT of the exhaust VVT 11.

As a result of this, by interpolating between the values of the above-mentioned map based on the engine rotational speed Ne and the individual phase angles InVVT and ExVVT which are obtained in the course of the control of the engine 1, it is possible to calculate the Kex calculation gain and the Kex calculation offset which are used as the coefficients or factors for calculating the exhaust efficiency Kex.

Here, note that as map data in the Kex calculation gain setting part 401 and the Kex calculation offset setting part 403, the slope and the segment (refer to FIG. 8) of the linear approximation calculated for the engine rotational speed Ne and every individual phase angles InVVT and ExVVT are set.

Subsequently, a reference value of the exhaust efficiency Kex is calculated with a linear function approximation according to the calculation operations in the multiplier 402 and the adder 404.

Here, note that in the calculation operations of FIG. 11, the intake manifold pressure ratio (peak value) Rpp, which is obtained by normalizing the intake manifold pressure peak value Pbp by the atmospheric pressure Pa, is used as the intake manifold pressure peak value Pbp, but instead, the intake manifold pressure peak value Pbp may be used as it is.

On the other hand, the Kex correction amount setting part 405 calculates the exhaust efficiency error ΔKex, which is used as the Kex correction amount, by the use of the map data of the engine rotational speed Ne and the intake manifold pressure ratio (peak value) Rpp.

The exhaust efficiency error ΔKex shown in FIG. 10 is set as the map data of the Kex correction amount.

Finally, the adder 406 calculates the exhaust efficiency Kex by adding the reference value of the exhaust efficiency Kex calculated with the linear function approximation to the Kex correction amount (=ΔKex).

According to the above, it is possible to calculate the exhaust efficiency Kex with simple calculation operations and a small number of data.

Next, the calculation part for the internal EGR rate Regr and the intake efficiency Kin will be explained, while referring to FIG. 12 and FIG. 14.

In FIG. 12, the calculation part for the internal EGR rate Regr and the intake efficiency Kin is provided with: the divider 501 that divides the exhaust efficiency Kex by the compression ratio ε; the exhaust temperature setting part 502 that serves to set an exhaust temperature based on a map of the engine rotational speed Ne and the intake manifold pressure ratio (peak value) Rpp; the cylinder internal temperature calculation part 503 that serves to calculate the cylinder internal temperature based on the result of the division of the divider 501, the exhaust temperature Tex, and the intake manifold temperature Tb; the Pin calculation gain setting part 504 that serves to set a Pin calculation gain based on the map of the engine rotational speed Ne and the phase angle InVVT of the intake VVT 10; the Pin calculation offset setting part 505 that serves to set a Pin calculation offset based on the map the engine rotational speed Ne and the phase angle InVVT of the intake VVT 10; the pressure ratio calculation part 506 that serves to calculate a pressure ratio based on the set values of the Pin calculation gain and the Pin calculation offset from the intake manifold pressure peak value Pbp and the individual setting parts 504, 505; and the intake efficiency calculation part 507 that serves to calculate the intake efficiency based on the intake manifold temperature Tb and the calculation results (the cylinder internal temperature Tin and the pressure ratio Pin/Pbp) from the individual calculation parts 503, 506.

First, the divider 501 calculates the internal EGR rate Regr by the use of the above-mentioned expression (15), based on the exhaust efficiency Kex and the compression ratio ε which have been calculated by the calculation part for the exhaust efficiency Kex (FIG. 11), and the exhaust temperature setting part 502 calculates the exhaust temperature Tex based on the map of the engine rotational speed Ne and the intake manifold pressure ratio (peak value) Rpp.

Here, note that as the map data in the exhaust temperature setting part 502, it is just necessary to set a measured value for every engine rotational speed Ne and every intake manifold pressure peak value Pbp.

Alternatively, without the use of such a map, the exhaust temperature Tex may be calculated by the use of an index such as a thermal efficiency, which is separately calculated for engine control, or still more simply, the exhaust temperature Tex may also be set as a fixed value (e.g., about 800 degrees C.).

Subsequently, the cylinder internal temperature calculation part 503 calculates the cylinder internal temperature Tin at the time of the end of the intake stroke by using the above-mentioned expression (19), based on the internal EGR rate Regr and the exhaust temperature Tex which have been previously calculated, and the intake manifold temperature Tb which is separately measured.

On the other hand, the Pin calculation gain setting part 504 and the Pin calculation offset setting part 505, calculate the Pin calculation gain Kgain and the Pin calculation offset Kofs, respectively, which are used as the coefficients or factors for calculating the pressure ratio Pin/Pbp, by using the map data of the engine rotational speed Ne and the phase angle InVVT of the intake VVT 10.

Next, the pressure ratio calculation part 506 calculates the pressure ratio Pin/Pbp by using the above-mentioned expression (18), based on the intake manifold pressure peak value Pbp, the Pin calculation gain Kgain and the Pin calculation offset Kofs.

Finally, the intake efficiency calculation part 507 calculates the intake efficiency Kin by using the above-mentioned expression (18), based on the cylinder internal temperature Tin at the time of the end of the intake stroke, the intake manifold temperature Tb and the pressure ratio Pin/Pbp.

Next, the calculation part for the volumetric efficiency correction factor Kv will be explained, while referring to FIG. 13 and FIG. 14.

In FIG. 13, the calculation part for the volumetric efficiency correction factor Kv is provided with the volumetric efficiency correction factor calculation part 601.

The volumetric efficiency correction factor calculation part 601 calculates the volumetric efficiency correction factor Kv by using the above-mentioned expression (15), based on the exhaust efficiency Kex calculated by the calculation part for the exhaust efficiency Kex (FIG. 11), the intake efficiency Kin calculated by the calculation part for the internal EGR rate Regr and the intake efficiency Kin (FIG. 12), and the compression ratio ε.

In this manner, the volumetric efficiency correction factor Kv and the internal EGR rate Regr can be calculated in the volumetric efficiency correction factor calculation unit 22 in the cylinder intake air amount calculation unit 21.

As described above, the estimation device for a cylinder intake air amount and an internal EGR rate in an internal combustion engine according to the first embodiment (FIG. 1 through FIG. 14) of the present invention, which serves for estimating the cylinder intake air amount Qc(n)T(n) and the internal EGR rate Regr of the engine 1 (the internal combustion engine) connected to the intake manifold 6 (the intake pipe) at a location downstream of the electronic control throttle 4 (the throttle valve), is provided with: the volumetric efficiency correction factor calculation unit 22 (the volumetric efficiency corresponding value calculation unit) that calculates the volumetric efficiency correction factor Kv (the volumetric efficiency corresponding value) which is an index indicating an amount of air coming into the cylinder from the intake pipe; the cylinder intake air amount calculation unit 21 (the cylinder intake air amount estimation unit) that estimates an amount of air actually sucked into the cylinder by using the volumetric efficiency corresponding value; and the internal EGR rate estimation unit (the ECU 20) that estimates the internal EGR rate Regr based on an internal variable for calculating the volumetric efficiency corresponding value.

The volumetric efficiency correction factor calculation unit 22 (the volumetric efficiency corresponding value calculation unit) (FIG. 13 and FIG. 14) calculates the volumetric efficiency correction factor Kv (the volumetric efficiency corresponding value) based on the exhaust efficiency Kex, which is an index indicating an amount of residual gas which remains in the cylinder with the exhaust gas after combustion being not discharged into the exhaust manifold 13 (the exhaust pipe) from the interior of the cylinder, and the intake efficiency Kin, which is an index indicating an amount of air which comes into the cylinder from the intake pipe except for the amount of residual gas.

In addition, the internal EGR rate estimation unit (FIG. 12 and FIG. 14) calculates the internal EGR rate Regr based on the exhaust efficiency Kex.

According to the above construction, the volumetric efficiency correction factor Kv (the volumetric efficiency corresponding value) and the internal EGR rate Regr are calculated based on the intake efficiency Kin which represents the amount of fresh intake air and the exhaust efficiency Kex which represents the amount of residual gas, so it becomes possible to calculate the volumetric efficiency corresponding value and the internal EGR rate Regr with a high degree of accuracy according to the operating state of the engine 1.

In addition, the estimation device for a cylinder intake air amount and an internal EGR rate in an internal combustion engine according to the first embodiment of the present invention is provided with: the AFS 2 (an intake air amount detection unit) that is arranged at the upstream side of the electronic control throttle 4 (the throttle valve), and serves to detect an amount of intake air which passes through the throttle valve and is sucked into the engine 1 (the internal combustion engine); and the physical model that models a response delay of the intake system until the air having passed through the throttle valve comes into the cylinder.

In this case, the cylinder intake air amount calculation unit 21 (the cylinder intake air amount estimation unit) estimates the cylinder intake air amount Qc(n)T(n) actually sucked into the cylinder based on the amount of intake air, the volumetric efficiency correction factor Kv (the volumetric efficiency corresponding value), and the physical model.

According to the above-mentioned construction, in the measurement of the amount of intake air by means of the AFS 2, the cylinder intake air amount is calculated by the use of the simplified physical model and the volumetric efficiency correction factor Kv (the volumetric efficiency corresponding value), so it becomes possible to estimate the cylinder intake air amount Qc(n)T(n) to a sufficient degree of accuracy for controlling the engine 1 in a suitable manner, with a small number of adaptation constants and a small amount of calculation or computation load.

In addition, the volumetric efficiency correction factor calculation unit 22 (the volumetric efficiency corresponding value calculation unit) (FIG. 13, FIG. 14) calculates the volumetric efficiency correction factor Kv (the volumetric efficiency corresponding value) by the use of the expression (15) based on the intake efficiency Kin, the exhaust efficiency Kex, and the compression ratio $\epsilon$, and the internal EGR rate estimation unit (FIG. 12) calculates the internal EGR rate Regr by the use of the expression (15) based on the exhaust efficiency Kex, and the compression ratio $\epsilon$.

According to the above-mentioned construction, the volumetric efficiency correction factor Kv (the volumetric efficiency corresponding value) and the internal EGR rate Regr are calculated by means of the expression (15), so it becomes possible to estimate the volumetric efficiency corresponding value and the internal EGR rate based on a theoretical consideration with a high degree of accuracy.

Moreover, the intake efficiency Kin is calculated by the use of the expression (16) based on the cylinder internal pressure Pin [kPa] and an intake pipe internal pressure Pb [kPa] at the time of the end of the intake stroke, as well as the cylinder internal temperature Tin [degrees K] and an intake pipe internal temperature Tb [degrees K] at the time of the end of the intake stroke.

According to the above-mentioned construction, the intake efficiency Kin is calculated by means of the expression (16), so it becomes possible to estimate the intake efficiency Kin based on a theoretical consideration with a high degree of accuracy.

Further, the pressure ratio Pin/Pb (Pin/Pbp) between the cylinder internal pressure Pin at the time of the end of the intake stroke and the intake manifold pressure Pb (the intake pipe internal pressure) at that time, which is used for calculation of the intake efficiency Kin, is approximated as a linear function of the intake pipe internal pressure Pb.

According to the above-mentioned construction, since the pressure ratio Pin/Pb in the expression (16) is approximated as a linear function of the intake pipe internal pressure, it becomes possible to estimate the intake efficiency to a sufficient degree of accuracy for controlling the engine 1 in a suitable manner, with a small number of adaptation constants and a small amount of computation or calculation load.

Furthermore, the exhaust efficiency Kex is calculated by the use of the expression (20) based on a cylinder clearance volume (a volume of the combustion chamber in the cylinder at the time of top dead center) Vmin [cc], the residual gas volume Vex [cc], the cylinder internal pressure Pin [kPa] and an exhaust pipe internal pressure Pex [kPa] at the time of the end of the intake stroke, as well as the cylinder internal temperature Tin [degrees K] and the exhaust temperature Tex [degrees K] at the time of the end of the intake stroke.

According to the above-mentioned construction, the exhaust efficiency Kex is calculated by means of the expression (20), so it becomes possible to estimate the exhaust efficiency Kex based on a theoretical consideration with a high degree of accuracy.

In addition, the exhaust efficiency Kex is approximated as a linear function of the intake manifold pressure Pb (the intake pipe internal pressure), so it becomes possible to estimate the exhaust efficiency to a sufficient degree of accuracy for controlling the engine 1 in a suitable manner, with a small number of adaptation constants and a small amount of computation or calculation load.

Further, the intake manifold pressure peak value Pbp (the maximum value of the intake pipe internal pressure) between prescribed crank angles of the engine 1 (the internal combustion engine) is used as the intake manifold pressure Pb (the intake pipe internal pressure), so it becomes possible to estimate the volumetric efficiency correction factor Kv (the volumetric efficiency corresponding value) with a high degree of accuracy.

According to the first embodiment of the present invention, in the control device for an internal combustion engine which is provided with the intake VVT 10 and the exhaust VVT (a variable valve drive mechanism), the volumetric efficiency correction factor Kv (the volumetric efficiency corresponding value) and the internal EGR rate Regr are calculated based on the intake efficiency Kin which represents the amount of fresh intake air and the exhaust efficiency Kex which represents the amount of residual gas, as a result of which it is possible to calculate the volumetric efficiency corresponding value and the internal EGR rate according to an operating state of the internal combustion engine with a high degree of accuracy.

Moreover, by calculating the simplified physical model of the intake system and the volumetric efficiency correction factor, which is used in the simplified physical model in an approximate manner, it is possible to estimate the cylinder intake air amount and the amount of internal EGR to a sufficient degree of accuracy for controlling the engine 1 in a suitable manner, with a small number of adaptation constants and a small amount of calculation or computation load, without requiring a huge memory capacity.

That is, the volumetric efficiency correction factor Kv (the volumetric efficiency corresponding value) and the internal EGR rate Regr are calculated based on the exhaust efficiency Kex (a linear function of the intake pipe internal pressure), which is an index indicating the amount of residual gas remaining in the cylinder with the exhaust gas after combustion being not discharged from the interior of the cylinder to the exhaust manifold 13 (the exhaust pipe), and the intake efficiency Kin (a linear function of the intake pipe internal pressure), which is an index indicating the amount of air which comes into the cylinder from the intake manifold 6 (the intake pipe) except for the residual gas. As a result, it is possible to make an estimation with a high degree of accuracy by the use of a small number of adaptation constants.

Second Embodiment

Figure 15:
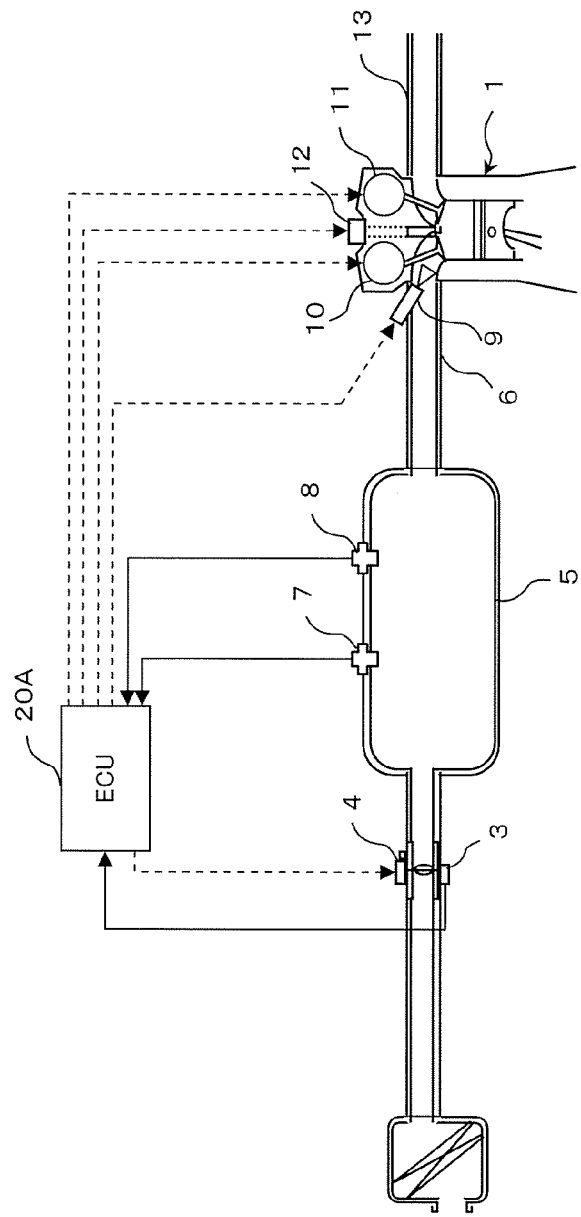
FIG. 15 is a block diagram schematically showing an estimation device for a cylinder intake air amount and an internal EGR rate in an internal combustion engine according to a second embodiment of the present invention.
Figure 16:
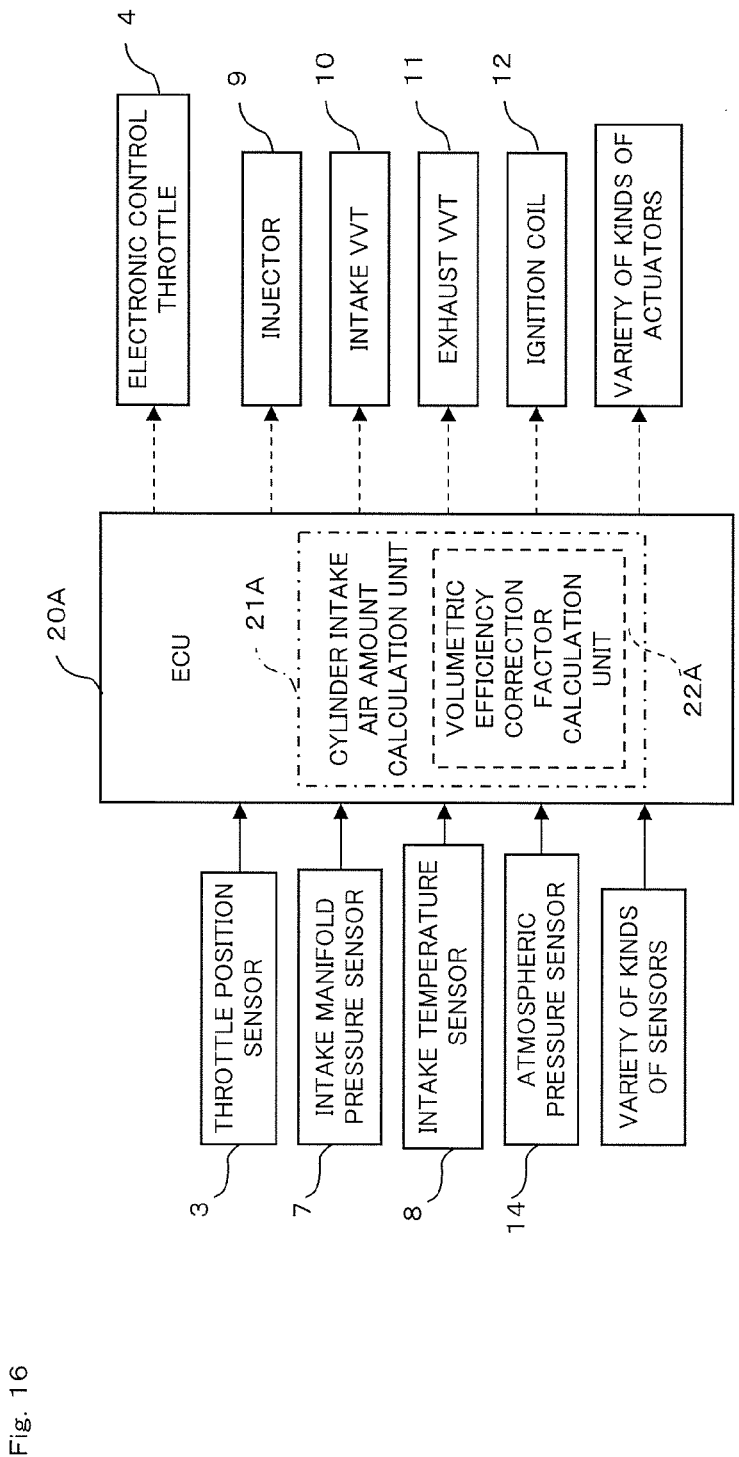
FIG. 16 is a block construction view schematically showing an engine and an engine control part according to the second embodiment of the present invention.

Here, note that in the above-mentioned first embodiment (FIG. 1 and FIG. 2), there is shown an example of the construction of an AFS system in which in the engine 1 provided with the intake VVT 10 and the exhaust VVT 11, an amount of air is measured by means of the AFS 2 which is arranged at the upstream side of the electronic control throttle 4 in the intake pipe, but there may instead be employed a construction of a S/D (Speed/Density) method in which an intake manifold pressure sensor 7 for measuring an intake manifold pressure Pb (intake pipe internal pressure) in the engine 1 is provided, as shown in FIG. 15 and FIG. 16, without the use of the AFS 2, so that the amount of air sucked into a cylinder is estimated from the intake manifold pressure Pb measured by the intake manifold pressure sensor 7 and the engine rotational speed Ne.

FIG. 15 is a block diagram schematically showing an estimation device for a cylinder intake air amount and an internal EGR rate in an internal combustion engine according to a second embodiment of the present invention, and FIG. 16 is a block construction view schematically showing an engine and an engine control part according to the second embodiment of the present invention.

In FIG. 15 and FIG. 16, parts similar to those in the above-mentioned first embodiment (see FIG. 1 and FIG. 2) are denoted by the same symbols as those in the above-mentioned first embodiment, and "A" is attached to those parts which correspond to the above-mentioned ones at a location after each symbol.

The second embodiment of the present invention has many common points with the above-mentioned first embodiment, and hence will be described by focusing on the points of difference from the first embodiment (FIG. 1 and FIG. 2).

In FIG. 15 and FIG. 16, the difference thereof from FIG. 1 and FIG. 2 is only that the AFS 2 for measuring the amount of intake air is not arranged in the upstream side of the intake system of the engine 1.

In FIG. 15, in the intake system of the engine 1, there is arranged an electronic control throttle 4 which is electronically controlled for regulating the amount of intake air.

In addition, a throttle position sensor 3 for measuring the degree of opening of the electronic control throttle 4 is mounted on the electronic control throttle 4.

Further, at the downstream side of the electronic control throttle 4, there are arranged the intake manifold pressure sensor 7 that serves to measure a pressure (an intake manifold pressure Pb) in a space (an intake manifold) including the interiors of a surge tank 5 and an intake manifold 6, and an intake temperature sensor 8 that serves to measure a temperature (an intake manifold temperature Tb) in the intake manifold.

An injector 9 for injecting fuel is arranged in the intake manifold 6 in the vicinity of an intake valve, and an intake VVT 10 and an exhaust VVT 11, which serve to make the valve timing of the intake and exhaust valves variable, are attached to the intake valve and the exhaust valve, respectively.

In addition, an ignition coil 12 for driving a spark plug to generate a spark inside a cylinder is arranged in a cylinder head. Moreover, in an exhaust manifold 13, there are provided an O2 sensor (not shown) for controlling the air fuel ratio of a mixture, and a catalyst (not shown) for purifying the exhaust gas.

In FIG. 16, the degree of opening of the electronic control throttle 4 measured by the throttle position sensor 3, the intake manifold pressure Pb measured by the intake manifold pressure sensor 7, the intake manifold temperature Tb measured by the intake temperature sensor 8, and an atmospheric pressure Pa measured by an atmospheric pressure sensor 14 are inputted to an ECU 20A.

Here, note that in place of the atmospheric pressure sensor 14 for measuring the atmospheric pressure Pa, a unit for estimating the atmospheric pressure Pa may be used, or an atmospheric pressure sensor built in the ECU 20A may be used.

In addition, a variety of kinds of measured values are also inputted to the ECU 20A from various kinds of sensors (an unillustrated accelerator opening sensor, an unillustrated crank angle sensor, and so on) other than the above.

In a cylinder intake air amount calculation unit 21A (of which details are to be described later) in the ECU 20A, a cylinder intake air amount is calculated from the intake manifold pressure Pb measured by the intake manifold pressure sensor 7.

The ECU 20A drives and controls the injector 9 and the ignition coil 12 based on the cylinder intake air amount which is calculated by the cylinder intake air amount calculation unit 21A.

In addition, the ECU 20A calculates a target torque based on a variety of kinds of input information (the degree of opening of the accelerator pedal, etc.), and also calculates a target cylinder intake air amount for achieving the target torque thus calculated. The ECU 20A further calculates a target throttle opening, a target intake VVT phase angle and a target exhaust VVT phase angle so as to achieve the target cylinder intake air amount, and controls the degree of opening of the electronic control throttle 4 and the individual phase angles InVVT and ExVVT of the intake VVT 10 and the exhaust VVT 11, so that these target values can be achieved.

Moreover, the ECU 20A controls a variety of kinds of other actuators, as required, which are not illustrated.

Next, reference will be made in detail to the function of the cylinder intake air amount calculation unit 21A, i.e., a physical model of the intake system for calculating the cylinder intake air amount from the intake manifold pressure Pb measured by the intake manifold pressure sensor 7, while referring to FIG. 15.

A formula for calculation of the cylinder intake air amount Qc(n)T(n) according to the S/D method basically uses the fresh air density and the average value ρ b(n) thereof for one stroke inside the intake manifold in the above-mentioned expression (2), and is further represented by the following expression (24) using the intake manifold pressure Pb(n) and the intake manifold temperature Tb(n), according to an equation of state (P=ρ RT).

[Expression 24]

$$Qc(n)T(n) = Kv(n) \cdot \rho_b(n) \cdot Vc \qquad (24)$$
$$= Kv(n) \cdot \frac{P_b(n)}{R \cdot T_b(n)} \cdot Vc$$

Here, note that the definition of each physical quantity in the expression (24) is the same as that in the above-mentioned first embodiment.

In the case of the S/D method, the AFS 2 is not used, and hence, the amount of intake air Qa(n)T(n) can not be measured. Accordingly, it is possible to calculate a volumetric efficiency correction factor Kv by the use of an air fuel ratio which is represented by the following expression (25), at the time of adaptation of engine control constants.

[Expression 25]

$$A/F = \frac{Qc(n)T(n)}{Qf(n)} \qquad (25)$$
$$= Kv(n) \cdot \frac{P_b(n) \cdot Vc}{R \cdot T_b(n)} \cdot \frac{1}{Qf(n)}$$

In the expression (25), Qf(n) is an amount of fuel injection, and can usually be calculated with the use of the flow characteristic of the injector 9 and the drive pulse width of the injector 9.

Next, reference will be made in detail to a processing procedure for achieving the expression (24) within the ECU 20A, i.e., a procedure to carry out the cylinder intake air amount calculation unit 21A within interrupt processing (e.g., B05 processing) at every prescribed crank angle, while referring to a flow chart shown in FIG. 17.

Figure 17:
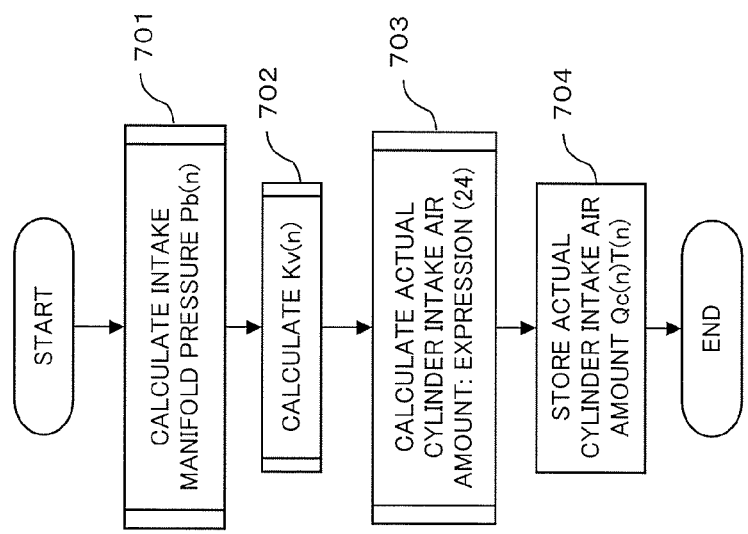
FIG. 17 is a flow chart showing calculation processing of an amount of intake air in a cylinder according to the second embodiment of the present invention.

FIG. 17 is a flow chart showing calculation processing of the cylinder intake air amount according to the second embodiment of the present invention, wherein individual steps 702 through 704 correspond to the above-mentioned individual steps 302, 301 and 306 (FIG. 3), respectively.

In FIG. 17, the cylinder intake air amount calculation unit 21A first calculates an average value of the intake manifold pressure Pb(n) [KPa] for one stroke (step 701).

In order to achieve the calculation processing of step 701, for example, it is just necessary to integrate the output voltage of the intake manifold pressure sensor 7, while sampling it every 1.25 ms, and to divide an integrated value of the output voltage from the last interrupt processing until the current interrupt processing by the number of times or frequency of integration. As a result of this, it is possible to calculate the intake manifold pressure average value Pb(n) [kPa] for one stroke.

Subsequently, the volumetric efficiency correction factor Kv(n) is calculated (step 702).

The processing of step 702 corresponds to a volumetric efficiency correction factor calculation unit 22A, and a calculation part for the volumetric efficiency correction factor Kv(n) in the volumetric efficiency correction factor calculation unit 22A carries out the same calculation processing as the above-mentioned one (refer to FIG. 13).

Subsequently, an actual cylinder intake air amount Qc(n)T(n) [g] is calculated by the expression (24) (step 703), and finally, the actual cylinder intake air amount Qc(n)T(n) [g] calculated in step 703 is stored (step 704), and then, the processing routine of FIG. 17 is ended.

As shown in FIG. 17, it is possible to carry out the calculation of the actual cylinder intake air amount Qc(n)T(n) [g] with a high degree of accuracy by means of simple calculation processing using the volumetric efficiency correction factor Kv(n).

As a result of this, in the above-mentioned AFS method, and in the S/D method according to the first embodiment of the present invention, too, it is possible to carry out the calculation of the actual cylinder intake air amount Qc(n)T(n) [g] by means of a simplified physical model of the intake system.

In addition, by approximately calculating the volumetric efficiency correction factor Kv, which is required in the process of the calculation of the actual cylinder intake air amount, it is possible to calculate the volumetric efficiency correction factor Kv to a sufficient degree of accuracy for controlling the engine 1 in a suitable manner, with a small number of adaptation constants and a small amount of calculation or computation load, without requiring a huge memory capacity, and at the same time, it is also possible to calculate an internal EGR rate Regr as well.

As described above, the estimation device for a cylinder intake air amount and an internal EGR rate in an internal combustion engine according to the second embodiment (FIG. 15 through FIG. 17) of the present invention, which serves for estimating the cylinder intake air amount Qc(n)T(n) and the internal EGR rate Regr of the engine 1 (the internal combustion engine) connected to the intake manifold 6 (the intake pipe) at a location downstream of the electronic control throttle 4 (the throttle valve), is provided with: the volumetric efficiency correction factor calculation unit 22A (a volumetric efficiency corresponding value calculation unit) that calculates the volumetric efficiency correction factor Kv (the volumetric efficiency corresponding value) which is an index indicating an amount of air coming into the cylinder from the intake pipe; the cylinder intake air amount calculation unit 21A (a cylinder intake air amount estimation unit) that estimates an amount of air actually sucked into the cylinder by using the volumetric efficiency corresponding value; and an internal EGR rate estimation unit (the ECU 20A) that estimates the internal EGR rate Regr based on an internal variable for calculating the volumetric efficiency corresponding value.

The volumetric efficiency correction factor calculation unit 22A (the volumetric efficiency corresponding value calculation unit) calculates the volumetric efficiency correction factor Kv (the volumetric efficiency corresponding value) based on an exhaust efficiency Kex, which is an index indicating an amount of residual gas which remains in the cylinder with the exhaust gas after combustion being not discharged into the exhaust manifold 13 (the exhaust pipe) from the interior of the cylinder, and an intake efficiency Kin, which is an index indicating an amount of air which comes into the cylinder from the intake pipe except for the amount of residual gas.

In addition, the internal EGR rate estimation unit calculates the internal EGR rate Regr based on the exhaust efficiency Kex.

According to the above-mentioned construction, the volumetric efficiency correction factor Kv (the volumetric efficiency corresponding value) and the internal EGR rate Regr are calculated based on the intake efficiency Kin which represents the amount of fresh intake air and the exhaust efficiency Kex which represents the amount of residual gas, so it becomes possible to calculate the volumetric efficiency corresponding value and the internal EGR rate Regr with a high degree of accuracy according to the operating state of the engine 1.

In addition, the estimation device for a cylinder intake air amount and an internal EGR rate in an internal combustion engine according to the second embodiment of the present invention is provided with the intake manifold pressure sensor 7 (an intake pipe internal pressure detection unit) that serves to detect the pressure in the intake pipe as the intake manifold pressure Pb (the intake pipe internal pressure).

In this case, the cylinder intake air amount calculation unit 21A (the cylinder intake air amount estimation unit) estimates the amount of intake air actually sucked into the cylinder based on the intake pipe internal pressure and the volumetric efficiency correction factor Kv (the volumetric efficiency corresponding value).

According to the above-mentioned construction, in the measurement of the amount of intake air by means of the S/D method, the cylinder intake air amount is calculated by the use of the simplified physical model and the volumetric efficiency corresponding value, so it becomes possible to estimate the cylinder intake air amount to a sufficient degree of accuracy for controlling the engine in a suitable manner, with a small number of adaptation constants and a small amount of calculation or computation load.

Moreover, the volumetric efficiency correction factor calculation unit 22A (the volumetric efficiency corresponding value calculation unit) calculates the volumetric efficiency correction factor Kv (the volumetric efficiency corresponding value) by the use of the expression (15) based on the intake efficiency Kin, the exhaust efficiency Kex, and the compression ratio $\epsilon$, and the internal EGR rate estimation unit (FIG. 12) calculates the internal EGR rate Regr by the use of the expression (15) based on the exhaust efficiency Kex and the compression ratio $\epsilon$. As a result, it becomes possible to estimate the volumetric efficiency corresponding value and the internal EGR rate based on a theoretical consideration with a high degree of accuracy.

Further, the intake efficiency Kin is calculated by the use of the expression (16) based on a cylinder internal pressure Pin [kPa] and an intake pipe internal pressure Pb [kPa] at the time of the end of the intake stroke, as well as a cylinder internal temperature Tin [degrees K] and an intake pipe internal temperature Tb [degrees K] at the time of the end of the intake stroke. As a result, it becomes possible to estimate the intake efficiency Kin based on a theoretical consideration with a high degree of accuracy.

Furthermore, a pressure ratio Pin/Pb (Pin/Pbp) between the cylinder internal pressure Pin at the time of the end of the intake stroke and the intake manifold pressure Pb (the intake pipe internal pressure) at that time, which is used for the expression (16) at the time of the calculation of the intake efficiency Kin, is approximated as a linear function of the intake pipe internal pressure. As a result, it becomes possible to estimate the intake efficiency to a sufficient degree of accuracy for controlling the engine 1 in a suitable manner, with a small number of adaptation constants and a small amount of computation or calculation load.

In addition, the exhaust efficiency Kex is calculated by the use of the expression (20) based on a cylinder clearance volume (a volume of the combustion chamber in the cylinder at the time of top dead center) Vmin [cc], a residual gas volume Vex [cc], the cylinder internal pressure Pin [kPa] and an exhaust pipe internal pressure Pex [kPa] at the time of the end of the intake stroke, as well as the cylinder internal temperature Tin [degrees K] and an exhaust temperature Tex [degrees K] at the time of the end of the intake stroke. As a result, it becomes possible to estimate the exhaust efficiency Kex based on a theoretical consideration with a high degree of accuracy.

Moreover, the exhaust efficiency Kex is approximated as a linear function of the intake manifold pressure Pb (the intake pipe internal pressure), so it becomes possible to estimate the exhaust efficiency to a sufficient degree of accuracy for controlling the engine 1 in a suitable manner, with a small number of adaptation constants and a small amount of computation or calculation load.

Further, an intake manifold pressure peak value Pbp (a maximum value of the intake pipe internal pressure) between prescribed crank angles of the engine 1 (the internal combustion engine) is used as the intake manifold pressure Pb (the intake pipe internal pressure), so it becomes possible to estimate the volumetric efficiency correction factor Kv (the volumetric efficiency corresponding value) with a high degree of accuracy.

According to the second embodiment of the present invention, in the control device for an internal combustion engine which is provided with the intake VVT 10 and the exhaust VVT (a variable valve drive mechanism), the volumetric efficiency correction factor Kv (the volumetric efficiency corresponding value) and the internal EGR rate Regr are calculated based on the intake efficiency Kin which represents the amount of fresh intake air and the exhaust efficiency Kex which represents the amount of residual gas, as a result of which it is possible to calculate the volumetric efficiency corresponding value and the internal EGR rate according to an operating state of the internal combustion engine with a high degree of accuracy.

Moreover, by calculating the simplified physical model of the intake system and the volumetric efficiency correction factor, which is used in the simplified physical model in an approximate manner, it is possible to estimate the cylinder intake air amount and the amount of internal EGR to a sufficient degree of accuracy for controlling the engine 1 in a suitable manner, with a small number of adaptation constants and a small amount of calculation or computation load, without requiring a huge memory capacity.

That is, the volumetric efficiency correction factor Kv (the volumetric efficiency corresponding value) and the internal EGR rate Regr are calculated based on the exhaust efficiency Kex (a linear function of the intake pipe internal pressure), which is an index indicating the amount of residual gas remaining in the cylinder with the exhaust gas after combustion being not discharged from the interior of the cylinder to the exhaust manifold 13 (the exhaust pipe), and the intake efficiency Kin (a linear function of the intake pipe internal pressure), which is an index indicating the amount of air which comes into the cylinder from the intake manifold 6 (the intake pipe) except for the residual gas, as a result of which, it is possible to make an estimation with a high degree of accuracy by the use of a small number of adaptation constants.

While the invention has been described in terms of preferred embodiments, those skilled in the art will recognize that the invention can be practiced with modifications within the spirit and scope of the appended claims.

What is claimed is:

1. An estimation device for a cylinder intake air amount and an internal EGR rate in an internal combustion engine, which serves for estimating an amount of intake air sucked into a cylinder and an internal EGR rate in the internal combustion engine which is connected to an intake pipe at a location downstream of a throttle valve, said estimation device comprising:
a volumetric efficiency corresponding value calculation unit that calculates a volumetric efficiency corresponding value which is an index indicating an amount of air coming into said cylinder from said intake pipe;
a cylinder intake air amount estimation unit that estimates an amount of air actually sucked into said cylinder by using said volumetric efficiency corresponding value; and
an internal EGR rate estimation unit that estimates the internal EGR rate based on an internal variable for calculating said volumetric efficiency corresponding value;
wherein said volumetric efficiency corresponding value calculation unit calculates said volumetric efficiency corresponding value based on an exhaust efficiency, which is an index indicating an amount of residual gas which remains in said cylinder with the exhaust gas after combustion being not discharged into the exhaust pipe from the interior of said cylinder, and an intake efficiency, which is an index indicating an amount of air which comes into said cylinder from said intake pipe except for said amount of residual gas; and
said internal EGR rate estimation unit calculates said internal EGR rate based on said exhaust efficiency.

2. The estimation device for a cylinder intake air amount and an internal EGR rate in an internal combustion engine, as set forth in claim 1, further comprising:
an intake air amount detection unit that is arranged at the upstream side of said throttle valve, and serves to detect an amount of intake air which passes through said throttle valve and is sucked into said internal combustion engine; and
a physical model that models a response delay of the intake system until the air having passed through said throttle valve comes into said cylinder;
wherein said cylinder intake air amount estimation unit estimates the amount of air actually sucked into said cylinder based on said amount of intake air, said volumetric efficiency corresponding value and said physical model.

3. The estimation device for a cylinder intake air amount and an internal EGR rate in an internal combustion engine, as set forth in claim 1, further comprising:
an intake pipe internal pressure detection unit that serves to detect a pressure in said intake pipe as an intake pipe internal pressure;
wherein said cylinder intake air amount estimation unit estimates the amount of intake air actually sucked into said cylinder based on said intake pipe internal pressure and said volumetric efficiency corresponding value.

4. The estimation device for a cylinder intake air amount and an internal EGR rate in an internal combustion engine, as set forth in claim 1, wherein
said volumetric efficiency corresponding value calculation unit calculates said volumetric efficiency corresponding value by using the following expression (1),

[Expression 1]

$$K_v = K_{in} \cdot \left( \frac{\varepsilon}{\varepsilon - 1} - K_{ex} \cdot \frac{\varepsilon}{\varepsilon - 1} \right) \quad (1)$$

based on said intake efficiency, said exhaust efficiency, and a compression ratio; and
said internal EGR rate estimation unit calculates said internal EGR rate by using the following expression (2),

[Expression 2], $$R_{egr} = \frac{K_{ex}}{\varepsilon} \quad (2)$$

based on said exhaust efficiency and said compression ratio.

5. The estimation device for a cylinder intake air amount and an internal EGR rate in an internal combustion engine, as set forth in claim 4, wherein
said intake efficiency is calculated by using the following expression (3),

[Expression 3]

$$K_{in} = \frac{P_{in}}{P_b} \cdot \frac{T_b}{T_{in}} \quad (3)$$

based on said cylinder internal pressure and an intake pipe internal pressure at the time of the end of an intake stroke, as well as a cylinder internal temperature and an intake pipe internal temperature at the time of the end of the intake stroke.

6. The estimation device for a cylinder intake air amount and an internal EGR rate in an internal combustion engine, as set forth in claim 5, wherein
a pressure ratio between said cylinder internal pressure and said intake pipe internal pressure at the time of the end of an intake stroke, which is used for calculation of said intake efficiency, is approximated as a linear function of said intake pipe internal pressure.

7. The estimation device for a cylinder intake air amount and an internal EGR rate in an internal combustion engine, as set forth in claim 4, wherein
said exhaust efficiency is calculated by using the following expression (4),

[Expression 4]

$$K_{ex} = \frac{V_{ex}}{V_{min}} \cdot \frac{P_{ex}}{P_{in}} \cdot \frac{T_{in}}{T_{ex}} \quad (4)$$

based on a cylinder clearance volume (a volume of a combustion chamber in said cylinder at the time of top dead center) (Vmin [cc]), a residual gas volume, a cylinder internal pressure and an exhaust pipe internal pressure at the time of the end of an intake stroke, as well as a cylinder internal temperature and an exhaust temperature at the time of the end of the intake stroke.

8. The estimation device for a cylinder intake air amount and an internal EGR rate in an internal combustion engine, as set forth in claim 7, wherein
said exhaust efficiency is approximated as a linear function of said intake pipe internal pressure.

9. The estimation device for a cylinder intake air amount and an internal EGR rate in an internal combustion engine, as set forth in claim 5, wherein a maximum value of the intake pipe internal pressure between prescribed crank angles of said internal combustion engine is used as said intake pipe internal pressure.

* * * * *